US009679471B2

(12) United States Patent
Geerlings et al.

(10) Patent No.: US 9,679,471 B2
(45) Date of Patent: Jun. 13, 2017

(54) TRAINABLE TRANSCEIVER AND CLOUD COMPUTING SYSTEM ARCHITECTURE SYSTEMS AND METHODS

(71) Applicant: Gentex Corporation, Zeeland, MI (US)

(72) Inventors: Steven L. Geerlings, Holland, MI (US); Todd R. Witkowski, Zeeland, MI (US); Thomas S. Wright, Holland, MI (US); Douglas C. Papay, Zeeland, MI (US); Carl L. Shearer, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/688,925

(22) Filed: Apr. 16, 2015

(65) Prior Publication Data

US 2015/0302731 A1 Oct. 22, 2015

Related U.S. Application Data

(60) Provisional application No. 61/981,516, filed on Apr. 18, 2014.

(51) Int. Cl.
*G05B 19/00* (2006.01)
*G08C 17/02* (2006.01)
(Continued)

(52) U.S. Cl.
CPC ......... *G08C 17/02* (2013.01); *G07C 9/00007* (2013.01); *G08C 19/28* (2013.01); *G08C 2201/20* (2013.01)

(58) Field of Classification Search
CPC ........... H04N 5/4403; H04N 21/42204; G08C 2201/20; G08C 17/02
(Continued)

(56) References Cited

U.S. PATENT DOCUMENTS

| | | | |
|---|---|---|---|
| 5,614,891 | A | 3/1997 | Zeinstra et al. |
| 9,229,905 | B1 | 1/2016 | Penilla et al. |

(Continued)

FOREIGN PATENT DOCUMENTS

| | | | |
|---|---|---|---|
| DE | 1020100 15 104 | A1 | 10/2011 |
| WO | WO-2008/082482 | A2 | 7/2008 |

OTHER PUBLICATIONS

International Search Report and Written Opinion of the International Searching Authority in PCT/US2015/015262 dated Jul. 2, 2015, 10 pages.

(Continued)

*Primary Examiner* — Don N Vo
(74) *Attorney, Agent, or Firm* — Foley & Lardner LLP; Bradley D. Johnson

(57) ABSTRACT

A system for controlling a remote device includes a first trainable transceiver, a second trainable transceiver, and a cloud computing system configured to be in communication with the first trainable transceiver and the second trainable transceiver. The cloud computing system stores a code roll, and the cloud computing system transmits a current value of the code roll to the first trainable transceiver or the second trainable transceiver upon receiving a request transmission from the first trainable transceiver or the second trainable transceiver respectively.

19 Claims, 13 Drawing Sheets

(51) Int. Cl.
*G07C 9/00* (2006.01)
*G08C 19/28* (2006.01)

(58) Field of Classification Search
USPC ..................................................... 340/5.24
See application file for complete search history.

(56) References Cited

U.S. PATENT DOCUMENTS

| | | | | |
|---|---|---|---|---|
| 2003/0118187 | A1* | 6/2003 | Fitzgibbon | G07C 9/00182 380/270 |
| 2003/0141987 | A1 | 7/2003 | Hayes | |
| 2006/0232377 | A1* | 10/2006 | Witkowski | G08C 19/28 340/5.25 |
| 2008/0291047 | A1 | 11/2008 | Summerford et al. | |
| 2010/0029261 | A1 | 2/2010 | Mikkelsen et al. | |
| 2010/0159846 | A1* | 6/2010 | Witkowski | G07C 9/00857 455/70 |
| 2011/0037574 | A1* | 2/2011 | Pratt | G06Q 20/20 340/10.51 |
| 2011/0218965 | A1 | 9/2011 | Lee et al. | |
| 2011/0225451 | A1 | 9/2011 | Leggette et al. | |
| 2011/0227698 | A1 | 9/2011 | Witkowski et al. | |
| 2011/0287757 | A1* | 11/2011 | Nykoluk | G08C 17/02 455/419 |
| 2012/0133841 | A1* | 5/2012 | Vanderhoff | H04N 5/4403 348/734 |
| 2012/0191770 | A1* | 7/2012 | Perlmutter | H04L 67/04 709/201 |
| 2012/0254960 | A1 | 10/2012 | Lortz et al. | |
| 2013/0063243 | A1 | 3/2013 | Witkowski et al. | |
| 2013/0304863 | A1 | 11/2013 | Reber | |
| 2014/0245284 | A1 | 8/2014 | Alrabady et al. | |
| 2014/0327690 | A1 | 11/2014 | McGuire et al. | |
| 2015/0161832 | A1* | 6/2015 | Esselink | G07C 9/00015 340/5.22 |
| 2015/0310737 | A1 | 10/2015 | Simanowski et al. | |
| 2015/0310765 | A1 | 10/2015 | Wright et al. | |
| 2016/0009188 | A1 | 1/2016 | Yokoyama et al. | |

OTHER PUBLICATIONS

US Office Action on U.S. Appl. No. 14/688,911 Dtd May 27, 2016.
International Preliminary Report on Patentability and Transmittal in corresponding International Application No. PCT/US2015/026244, mailed Dec. 22, 2016, 9 pages.
International Search Report and Written Opinion of the International Searching Authority in corresponding International Application No. PCT/US2015/026244, mailed Dec. 8, 2016, 11 pages.
US Office Action on U.S. Appl. No. 14/688,911 Dtd Oct. 12, 2016.
US Office Action on U.S. Appl. No. 14/688,969 Dtd Oct. 20, 2016.
US Notice of Allowance on U.S. Appl. No. 14/688,911, filed Feb. 24, 2017.

* cited by examiner

TRAINABLE TRANSCEIVER AND CLOUD COMPUTING SYSTEM ARCHITECTURE SYSTEMS AND METHODS

CROSS-REFERENCE TO RELATED APPLICATIONS

This application claims the benefit of U.S. Provisional Application No. 61/981,516, filed Apr. 18, 2014, which is hereby incorporated by reference in its entirety.

BACKGROUND OF THE INVENTION

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging and difficult to develop trainable transceivers which are easy to train to operate a variety of devices. It is further challenging and difficult to develop a trainable transceiver which interfaces with devices other than those being controlled (e.g., vehicle systems and/or systems located remote to the vehicle) for use in training or for performing additional useful functions. It is further challenging and difficult to develop a trainable transceiver which may access information from a remote source for use in training the trainable transceiver to control a device.

SUMMARY OF THE INVENTION

One embodiment relates to a system for controlling a remote device includes a first trainable transceiver, a second trainable transceiver, and a cloud computing system configured to be in communication with the first trainable transceiver and the second trainable transceiver. The cloud computing system stores a code roll, and the cloud computing system transmits a current value of the code roll to the first trainable transceiver or the second trainable transceiver upon receiving a request transmission from the first trainable transceiver or the second trainable transceiver respectively.

Another embodiment relates to a method for controlling a remote device. The method includes storing, in a cloud computing system, a code roll corresponding to the remote device. The method further includes receiving, from a first trainable transceiver and at the cloud computing system, a request transmission and transmitting, from the cloud computing system, a current value of the code roll in response to the request transmission. In response to transmitting the current value of the code roll, the cloud computing system advances the code roll to a new value.

Another embodiment relates to a system for installation in a vehicle and for controlling a remote device, a trainable transceiver, communications electronics, and a processing circuit coupled to the trainable transceiver and the communications electronics. The processing circuit is configured to receive information via the communications electronics from a cloud computing system. The information includes a current value of a code roll associated with the remote device, the code roll stored and advanced by the cloud computing system. The cloud computing system is configured to transmit information to the processing circuit or not transmit information to the processing circuit based on a schedule.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
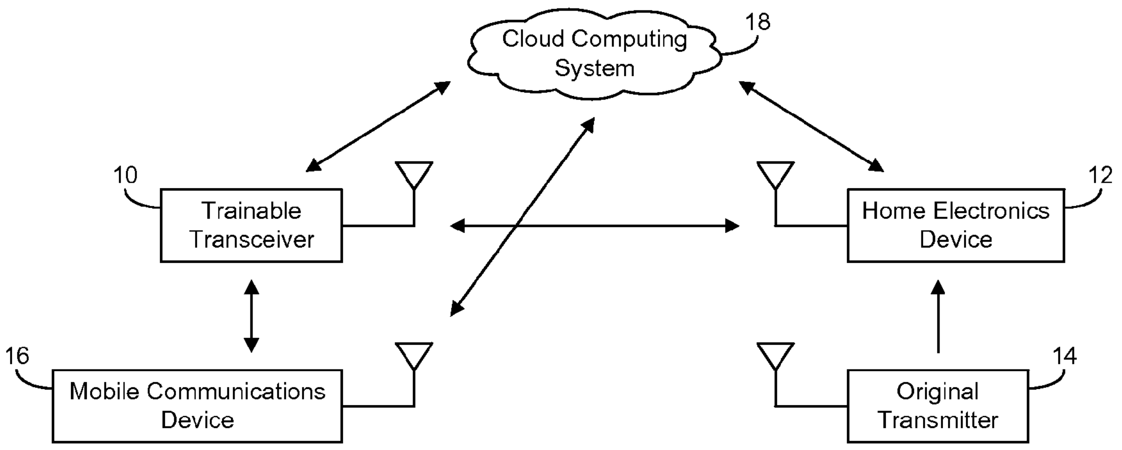
FIG. 1 illustrates an exemplary embodiment of communication among devices including a trainable transceiver, mobile communications device, home electronics device, original transmitter, and cloud computing system.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information for cameras (e.g., imaging information may be received) and/or other sensors. The cameras and/or other sensors may communicate with a trainable transceiver wirelessly (e.g., using one or more transceivers) or through a wired connection.

In some embodiments, a trainable transceiver may communicate with mobile communications devices (e.g., cell phones, tablets, smartphones, or other communication devices). In some embodiments, mobile communications devices may include other mobile electronics devices such as laptops, personal computers, and/or other devices. In still further embodiments, the trainable transceiver is configured to communicate with networking equipment such as routers, servers, cellular towers, switches, and/or other hardware for enabling network communication. The network may be the internet, an intranet, and/or a cloud computing system architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

A trainable transceiver may be mounted or otherwise attached to a vehicle in a variety of locations. For example, a trainable transceiver may be integrated into a dashboard or center stack (e.g., infotainment center) of a vehicle. The trainable transceiver may be integrated into the vehicle by a vehicle manufacturer. A trainable transceiver may be located in other peripheral locations. For example, a trainable transceiver may be removably mounted to a visor. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror of the vehicle. A vehicle manufacturer may include a trainable transceiver in the rear view mirror.

In other embodiments, a vehicle may be retrofit to include a trainable transceiver. This may include attaching a trainable transceiver to a vehicle surface using a clip, adhesive, or other mounting hardware as described above. Alternatively, it may include replacing a vehicle component with one that includes an integrated trainable transceiver and/or installing a vehicle component which includes an integrated trainable transceiver. For example, an aftermarket rear view mirror, vehicle camera system (e.g., one or more cameras and one or more display screens), and/or infotainment center may include an integrated trainable transceiver. In further embodiments, one or more components of a trainable transceiver may be distributed within the vehicle.

Referring now to FIG. 1, a trainable transceiver 10 may communicate with a home electronics device 12. In some embodiments, the trainable transceiver 10 and home electronics device 12 communicate using two way communications. For example, the trainable transceiver 10 may transmit activation signals, control signals, requests for information, data and/or other information to the home electronics device 12. The home electronics device 12 may transmit status information, responses to requests for information, data, requests for information, and/or other information to the trainable transceiver 10. The same and/or similar two way communication may be made between the trainable transceiver 10 and a remote device. In other embodiments, there is only one way communication between the trainable transceiver 10 and the home electronics device 12 and/or remote device. For example, the trainable transceiver 10 transmits activation signals, control signals, data, and/or other information to the home electronics device 12 and/or remote device, and the trainable transceiver 10 does not receive transmissions from the home electronics device 12 or remote device.

In some embodiments, an original transmitter 14 may communicate with the home electronics device 12 and/or remote device. In one embodiment, the original transmitter 14 communicates with the home electronics device 12 and/or remote device using one way communication. For example, the original transmitter 14 may transmit an activation signal to the home electronics device 12 and/or remote device. In some embodiments, the original transmitter 14 may be the source of an activation signal, activation signal parameters, and/or other information related to controlling a home electronics device 12 and/or remote device. This information may be received by a mobile communications device 16 as discussed in greater detail herein. In alternative embodiments, the original transmitter 14 is capable of two way communication. In some embodiments, the trainable transceiver 10 may be configured to receive an activation signal and/or other information from the original transmitter 14.

In one embodiment, the trainable transceiver 10 is capable of two way communication with the mobile communications device 16. For example, a smartphone may be paired with a trainable transceiver such that the trainable transceiver and smartphone communicate using wireless transceivers (e.g., using radio frequency transceivers and/or a protocol such as Bluetooth communication). The trainable transceiver 10 and the mobile communications device 16 may exchange information such as status, notifications, activation signals, training information, activation signal parameters, device identification information (e.g., the serial number, make, and/or model of a home electronics device), and/or other information.

In some embodiments, information such as activation signal parameters, training information, status information, notifications, diagnostic information, and/or other information may be stored in a cloud computing system 18 based architecture (e.g., highly available server computers available via Internet). The cloud computing system 18 resources may be in unidirectional or bi-directional communication with one or more trainable transceivers, mobile communications devices, home electronics devices, remote devices, and/or other devices. Communication between the cloud computing system 18 and other devices may allow for the transmission of information stored on the cloud computing system 18 to the device and/or the transmission of information stored on the device to the cloud computing system 18.

In some embodiments, the communication described herein with respect to FIG. 1 is wireless communication. In other embodiments, communication may be wired communication. For example, communication between two or more devices may use a wireless network, wireless transceiver, and/or wireless communication protocol (e.g., WiFi, Zigbee, Bluetooth, cellular, etc.), a wired interface and/or protocol (e.g., Ethernet, universal serial bus (USB), Firewire, etc.), or other communications connection (e.g. infrared, optical, ultrasound, etc.). In some embodiments, free-space optical communication techniques and/or techniques in which data is encoded onto light emitted by a light source through modulation of the light source (e.g., frequency modulation, amplitude modulation, etc.) may be used for wireless communications between one or more of the devices illustrated in FIG. 1. For example, the devices may include light sources such as light emitting diodes and light sensors (e.g., a camera, photodector) used to generate light based signals and to receive light based signals. This and/or other hardware (e.g., control circuit) or software may allow two or more devices to communicate using light. In other embodiments, two or more of the devices illustrated in FIG. 1 communicate using sound based communication. For example, a modulated sound wave technique, a technique based on the frequency, wavelength, amplitude, Decibel, and/or other parameters of the sound wave(s), protocol (e.g., fax protocol), and/or other techniques may be used to communicate using sound waves. The sound waves may be in the ultrasound frequency spectrum, acoustic (e.g., audible) spectrum, infrasound spectrum, and/or other spectrum. The devices may include hardware and/or software used in communicating with sound such as control circuits, speakers, microphones, and/or other hardware and/or software used to facilitate sound based communication. In further embodiments, other types of communication may be used. For example, two devices may communicate by exchanging machine readable images containing encoded information (e.g., a display of a first device displays a machine readable image read by a camera of a second device an decoded using a control circuit), by exchanging text messages, by exchanging e-mails, and/or using other types of communication.

Figure 2A:
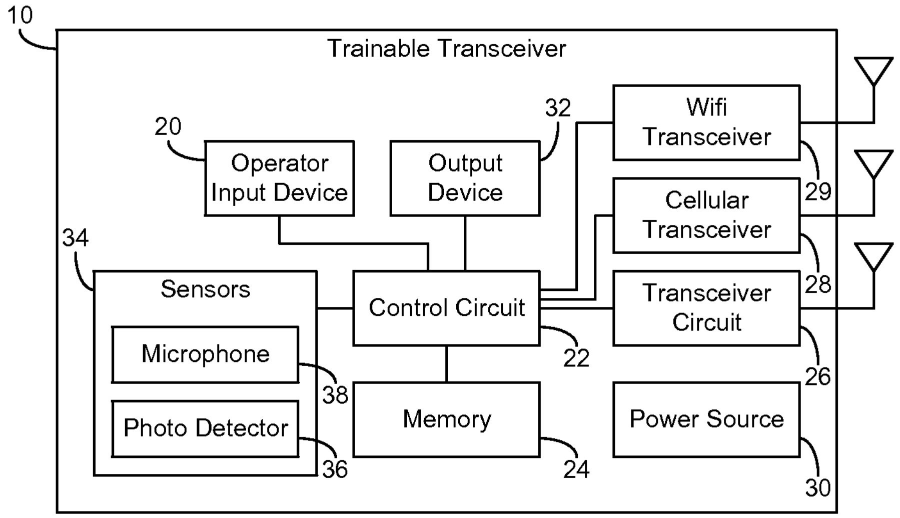
FIG. 2A illustrates an exemplary embodiment of components included in a trainable transceiver.

Referring now to FIG. 2A, an exemplary embodiment of a trainable transceiver is illustrated. In one embodiment, the trainable transceiver 10 includes an operator input device 20. The operator input device 20 may be one or more buttons. For example, the operator input device 20 may be three hard key buttons. In some embodiments, the operator input device 20 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action. In additional embodiments, the operator input device 20 may display data to a user or otherwise provide outputs in addition to receiving user input. For example, the operator input device 20 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. In some embodiments, the operator input device 20 is connected to a control circuit 22. The control circuit 22 may send information and or control signals or instructions to the operator input device 20. For example, the control circuit 22 may send output instructions to the operator input device 20 causing the display of an image. The control circuit 22 may also receive input signals, instructions, and/or data from the operator input device 20.

The control circuit 22 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit 22 may be a SoC individually or with additional hardware components described herein. The control circuit 22 may further include, in some embodiments, memory (e.g., random access memory, read only memory, flash memory, hard disk storage, flash memory storage, solid state drive memory, etc.). In further embodiments, the control circuit 22 may function as a controller for one or more hardware components included in the trainable transceiver 10. For example, the control circuit 22 may function as a controller for a touchscreen display or other operator input device, a controller for a transceiver, transmitter, receiver, or other communication device (e.g., implement a Bluetooth communications protocol).

In some embodiments, the control circuit 22 receives inputs from operator input devices 20 and processes the inputs. The inputs may be converted into control signals, data, inputs to be sent to the base station, etc. The control circuit 22 may control the transceiver circuit 26 and use the transceiver circuit 26 to communicate (e.g., receive signals and/or transmit signals) with one or more of original transmitters, home electronic devices, mobile communication devices, and/or remote devices. The control circuit 22 may also be used to in the training process.

The control circuit 22 is coupled to memory 24. The memory 24 may be used to facilitate the functions of the trainable transceiver described herein. Memory 24 may be volatile and/or non-volatile memory. For example, memory 24 may be random access memory, read only memory, flash memory, hard disk storage, flash memory storage, solid state drive memory, etc. In some embodiments, the control circuit 22 reads and writes to memory 24. Memory 24 may include computer code modules, data, computer instructions, or other information which may be executed by the control circuit 22 or otherwise facilitate the functions of the trainable transceiver 10 described herein. For example, memory 24 may include encryption codes, pairing information, identification information, a device registry, etc. Memory 24 and/or the control circuit 22 may facilitate the functions described herein using one or more programming techniques, data manipulation techniques, and/or processing techniques such as using algorithms, routines, lookup tables, arrays, searching, databases, comparisons, instructions, etc.

The trainable transceiver 10 may further include a transceiver circuit 26 coupled to the control circuit 22. The transceiver circuit 26 allows the trainable transceiver 10 to transmit and/or receive wireless communication signals. The wireless communication signals may be transmitted to or received from a variety of wireless devices (e.g., an original transmitter, home electronic device, mobile communications device, and/or remote device). The transceiver circuit 26 may be controlled by the control circuit 22. For example, the control circuit 22 may turn on or off the transceiver circuit 26, the control circuit 22 may send data using the transceiver circuit 26, format information, an activation signal, control signal, and/or other signal or data for transmission via the transceiver circuit 26, or otherwise control the transceiver circuit 26. Inputs from the transceiver circuit 26 may also be received by the control circuit 22. In some embodiments, the transceiver circuit 26 may include additional hardware such as processors, memory, integrated circuits, antennas, etc. The transceiver circuit 26 may process information prior to transmission or upon reception and prior to passing the information to the control circuit 22. In some embodiments, the transceiver circuit 26 may be coupled directly to memory 24 (e.g., to store encryption data, retrieve encryption data, etc.). In further embodiments, the transceiver circuit 26 may include one or more transceivers, transmitters, receivers, etc. For example, the transceiver circuit 26 may include an optical transceiver, near field communication (NFC) transceiver, etc. In some embodiments, the transceiver circuit 26 may be implemented as a SoC.

In further embodiments, the control circuit 22 is coupled to additional transceiver circuits, receivers, and/or transmitters. In one embodiment, the additional transceiver circuit is used for communicating with (transmitting to and/or receiving from) home electronic devices and/or remote devices. In some embodiments, the additional transceiver circuit may be or include a cellular transceiver 28. The trainable transceiver 10 may use the transceiver circuit 26 and/or an additional transceiver (e.g., a cellular transceiver 28) to access the internet, other networks, and/or network hardware. In other embodiments, the trainable transceiver 10 may access the internet, other networks, and/or network hardware through an intermediate device in communication with the trainable transceiver 10 such as a mobile communications device.

Additional transceivers may be used to communicate with other devices (e.g., mobile communications devices, cameras, network devices, a cloud computing system, or other wireless devices). The transceiver circuit 26 and other transceivers may operate using different frequency, transmission spectrums, protocols, and/or otherwise transmit and/or receive signals using different techniques. For example, the transceiver circuit 26 may be configured to send activation signals to a home electronic device (e.g., a garage door opener) using an encrypted radio wave transmission and an additional transceiver may communicate with a remote communications device (e.g., a smartphone) using a Bluetooth transceiver (e.g., a Bluetooth low energy (BLE) transceiver) and Bluetooth communications protocol (e.g., BLE protocol). In some embodiments, the trainable transceiver 10 includes a WiFi transceiver 29. The WiFi transceiver 29 may be configured to allow communication between the trainable transceiver 10 and a other hardware (e.g., a wireless router) using a wireless network. The WiFi transceiver 29 may communicate according to a WiFi protocol such as IEEE 802.11. The WiFi transceiver 29 may allow the trainable transceiver 10 to access the internet through additional hardware such as a wireless router with access to the internet.

The trainable transceiver 10 may communicate with original transmitters 14, home electronic devices 12, remote devices, mobile communications devices 16, network devices, and/or other devices as described above using the transceiver circuit 26 and/or other additional transceiver circuits or hardware. The devices with which the trainable transceiver communicates may include transceivers, transmitters, and/or receivers. The communication may be one-way or two-way communication.

With continued reference to FIG. 2A, the trainable transceiver 10 may include a power source 30. The power source 30 provides electrical power to the components of the trainable transceiver 10. In one embodiment, the power source 30 is self-contained. For example, the power source 30 may be a battery, solar cell, or other power source not requiring a wired connection to another source of electrical power. In other embodiments, the power source 30 may be a wired connection to another power source. For example, the power source 30 may be a wired connection to a vehicle power supply system. The power source 30 may be integrated into the vehicle electrical system. This may allow the trainable transceiver 10 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle.

In some embodiments, the trainable transceiver 10 includes one or more output devices 32. In some embodiments, the output devices 32 are controlled by the control circuit 22, provide input to the control circuit 22, communicate output from the control circuit 22 to a user or other device, and/or are otherwise in communication with the control circuit 22. Output devices 32 may include a display. The display allows for visual communication with a user. The display may be configured to output a visual representation based on computer instructions, control signals, computer code, frame buffers, and/or other electronic signals or information. In some embodiments, the display includes a graphics processing unit (GPU), controller, and/or other hardware to facilitate the handling of and display of graphics information. In other embodiments, the display does not include hardware for processing images or image data. The display may be any hardware configured to display images using the emission of light or another technique. For example, the display may be a liquid crystal display, e-ink display, plasma display, light emitting diode (LED) display, or other display device. In some embodiments, the display may be part of or otherwise integrated with a user input device such as a touchscreen display (e.g., projected capacitance touchscreen, resistance based touchscreen, and/or touchscreen based on other touch sensing technology). The display be a touchscreen display. Output devices 32 may also include a speaker for providing audio outputs. Output devices may further include an LED or other light source (e.g., a backlight).

In some embodiments, the trainable transceiver 10 includes one or more sensors 34. The sensors 34 may be controlled by the control circuit 22, provide inputs to the control circuit 22, and/or otherwise interact with the control circuit 22. In some embodiments, sensors 34 include one or more accelerometers, cameras, light sensors (e.g., photodetectors 36), microphones 38, and/or other sensors or input devices. Sensors 34 may further include a global positioning system (GPS) receiver. The GPS receiver may receive position information from another source (e.g., a satellite). The position may be based on GPS coordinates.

Figure 2B:
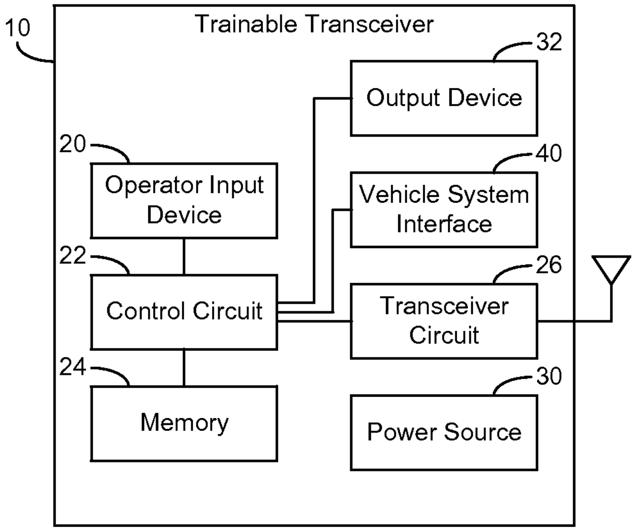
FIG. 2B illustrates an exemplary embodiment of a trainable transceiver including a vehicle system interface.

Referring now to FIG. 2B, the trainable transceiver 10 may connect to a vehicle electronics system in some embodiments. The connection to the vehicle electronics system may be made using a vehicle electronics system interface 40 included in the trainable transceiver 10. In some embodiments, the vehicle electronics system interface 40 includes physical connection such as ports, connectors, wiring, and/or other hardware used to create an electrical connection between the control circuit 22 of the trainable transceiver 10 and the vehicle electronics system. In alternative embodiments, the control circuit 22 of the trainable transceiver 10 and the vehicle electronics system are directly connected (e.g., wired such that outputs from one control circuit are received as inputs at the other control circuit and/or vice versa). In further embodiments, the vehicle electronics system interface 40 may include and/or be implemented by computer programming, code, instructions, or other software stored in memory 24 in the trainable transceiver 10 and/or the rear view mirror. Advantageously, the connection between the trainable transceiver 10 and the vehicle electronics system may allow for the trainable transceiver 10 to access, control, provide outputs to, receive inputs from, and/or otherwise communicate with components of the vehicle. The connection between the trainable transceiver 10 and the vehicle electronics system may provide an advantage of allowing the trainable transceiver 10 to make use of existing vehicle hardware for use with functions of the trainable transceiver.

The vehicle electronics system may include processors (e.g., electronic control units (ECU), engine control modules (ECM), or other vehicle processors), memory, buses (e.g., controller area network (CAN) bus, sensors, on-board diagnostics equipment (e.g., following the (OBD)-II standard or other protocol), cameras, displays, transceivers, infotainment systems, and/or other components integrated with a vehicle's electronics systems or otherwise networked (e.g., a controller area network of vehicle components). For example, the vehicle electronics system may include, be coupled to, and/or otherwise communicate with a GPS interface. The GPS interface may be configured to receive position information (e.g., from a GPS satellite source). Using the vehicle electronics system, vehicle electronics system interface 40, and/or control circuit 22, the trainable transceiver 10 may have access to position information from the GPS interface (e.g., GPS coordinates corresponding to the current location of the vehicle).

Continuing the example, the vehicle electronics system may include, be coupled to, and/or otherwise communicate with a display of the vehicle. The display may include or be a dashboard display, instrument panel display, infotainment display, rear view mirror display, rear seat display, and/or other displays in the vehicle. Using the vehicle electronics system, vehicle electronics system interface 40, and/or control circuit 22, the trainable transceiver 10 may have access to a display of the vehicle. The trainable transceiver 10 may output images (e.g., using a frame buffer) to one or more displays of the vehicle. The trainable transceiver 10 may output information related to training the trainable transceiver 10 (e.g., steps, procedures, instructions, current progress, etc.), information related to a home electronics device and/or remote device (e.g., status information, training information, identification information, etc.), diagnostic information, and/or other information accessible to the trainable transceiver 10 directly or through an intermediate device.

Continuing the example, the vehicle electronics system may include, be coupled to, and/or otherwise communicate with input/output devices of the vehicle. Input/output devices may include hardware for receiving user input and providing output to a user. Input/output device may include operator input devices, hardkey buttons, softkey buttons, touchscreens, microphones, speakers, displays, and/or other hardware. Using the vehicle electronics system, vehicle electronics system interface 40, and/or control circuit 22, the trainable transceiver 10 may receive inputs from and/or generate outputs using input/output devices of the vehicle.

Continuing the example, the vehicle electronics system may include, be coupled to, and/or otherwise communicate with additional transceivers included in the vehicle. Additional transceivers may include NFC transceivers (e.g., used for pairing a mobile communications device with an infotainment system), BLE transceivers (e.g., used for wireless communication between a mobile communications device and an infotainment system), cellular transceivers (e.g., used for accessing the internet with the vehicle infotainment system and/or other hardware), radio transceivers (e.g., for FM radio, AM radio, high definition radio, satellite radio, etc.), and/or other transceivers. Using the vehicle electronics system, vehicle electronics system interface 40, and/or control circuit 22, the trainable transceiver 10 may receive information from, send information to, control, communicate, and/or otherwise interact with additional transceivers of the vehicle. In some embodiments, the trainable transceiver 10 may use additional transceivers of the vehicle to communicate with other devices such as home electronics devices, remote devices, and/or mobile devices. In further embodiments, the trainable transceiver 10 may use additional transceivers of the vehicle to access the internet, communicate with servers, access other networks, and/or otherwise communicate with network hardware.

Figure 3A:
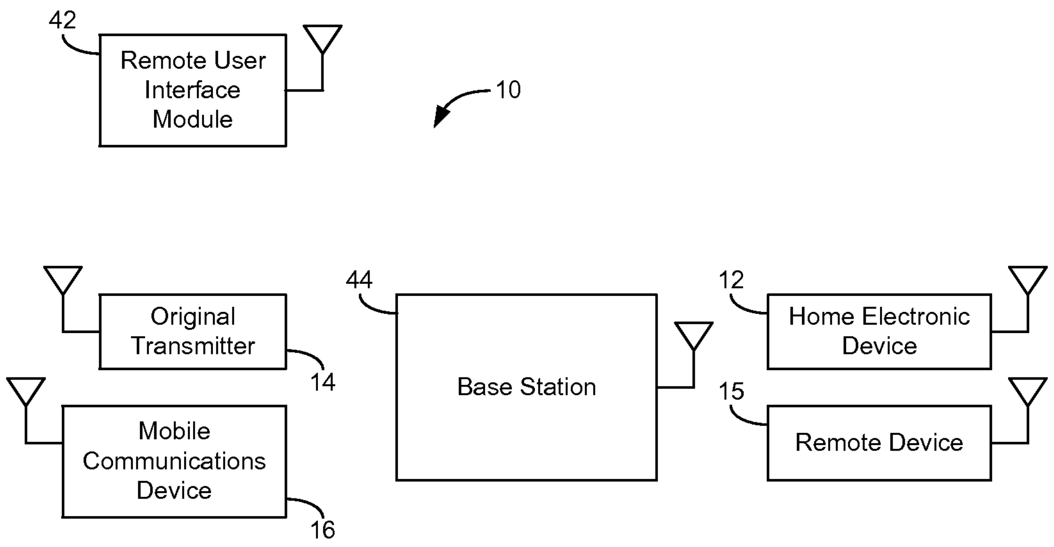
FIG. 3A illustrates a distributed trainable transceiver system including a remote user interface module and a base station according to an exemplary embodiment.
Figure 3B:
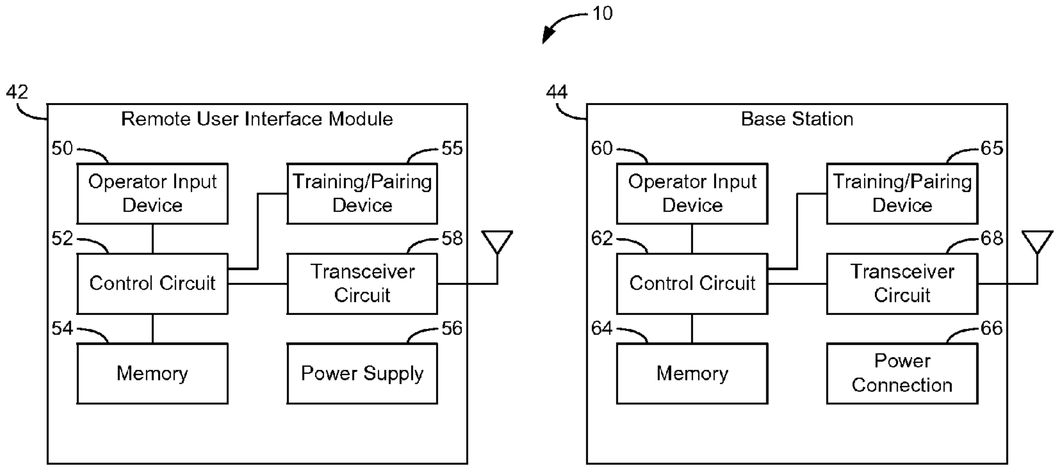
FIG. 3B illustrates an exemplary embodiment of components included in a remote user interface module and a base station.

Referring now to FIGS. 3A and 3B, in one embodiment, the trainable transceiver is a distributed system. The trainable transceiver 10 may include two modules, a remote user interface module 42 and a base station 44. The remote user interface module 42 may contain operator input devices 50, a power source 56, a control circuit 52, memory 54, output devices, and/or communications hardware. The base station 44 may contain operator input devices 60, a power source 66, a control circuit 62, memory 64, output devices, and/or communications hardware. The remote user interface module 42 may communicate with the base station 44 located apart from the remote user interface module 42. For example, the remote user interface module 42 may include a transceiver circuit 58 used to communicate with the base station 44. The base station 44 may communicate with the remote user interface module 42 using a transceiver circuit 68 and/or an additional transceiver such as those discussed above. The remote user interface module 42 may process user inputs and send information to a base station 44 with the transceiver circuit 58 configured to send an activation signal and/or other signal to another device. The base station 44 may include a more powerful (e.g., longer range) transceiver than the transceiver(s) in the remote user interface module 42.

In some embodiments, the remote user interface module 42 may contain a transceiver configured to allow communication between the remote user interface module and another device such as a remote device 15 and/or mobile communications device 16. The remote user interface module 42 may serve as a communication bridge between the remote device 15 or mobile communications device 16 and another device such as the base station 44 or the home electronics device 12 or remote device 15 in communication with the base station 44.

In other embodiments, the base station 44 may include a transceiver configured to allow communication between the remote user interface module 42 and another device such as the remote device 15 and/or mobile communications device 16. In some embodiments, the remote user interface module 42 includes a training/pairing device 55 and/or the base station 44 includes a training/pairing device 65. The training/pairing devices 55 and 65 may be or include one or more transceivers (e.g., NFC transceiver, BLE transceiver, etc.), microphones, speakers, light sensors, light sources, and/or other hardware for communication between devices. The training/pairing devices 55 and 65 may allow for communication using one or more of the techniques described above with reference to FIG. 1 (e.g., BLE communication, NFC communication, light based communication, sound based communication, etc.). The training/pairing device 55 of the remote user interface module 42 may allow the remote user interface module 42 to communicate with a mobile communications device 16 and/or a base station 44. The training/pairing device 65 of the base station 44 may allow the base station 44 to communicate with a mobile communications device 16 and/or a base station 44. Communication may include pairing a mobile communications device 16 such that communications with the mobile communications device are possible, pairing the remote user interface module 42 and the base station 44 such that communication between the two is possible, sending and/or receiving data, and/or other communication. In some embodiments, activation signal parameters, training information (e.g., device identification information), and/or other information related to the home electronics device 12 and/or remote device 15 are communicated between the mobile communications device 16 and the remote user interface module 42 and/or base station 44. In further embodiments, activation signal parameters, training information (e.g., device identification information), and/or other information related to the home electronics device 12 and/or remote device 15 are communicated between the remote user interface module 42 and base station 44. Communication may be unidirectional or bidirectional.

In some embodiments, the base station 44 is coupled to, connected to, and/or otherwise in communication with a system of the vehicle. For example, the base station 44 may be plugged into a power source of the vehicle such as a USB port, 12 volt power port, cigarette lighter, and/or other power source of the vehicle. In further embodiments, the base station 44 may be in communication with a vehicle electronics system. The remote user interface module 42 may be located within the vehicle remote from the base station 44. For example, the remote user interface module 42 may be coupled to a vehicle visor, rear view mirror, windshield, center counsel, and/or other vehicle component.

Figure 4:
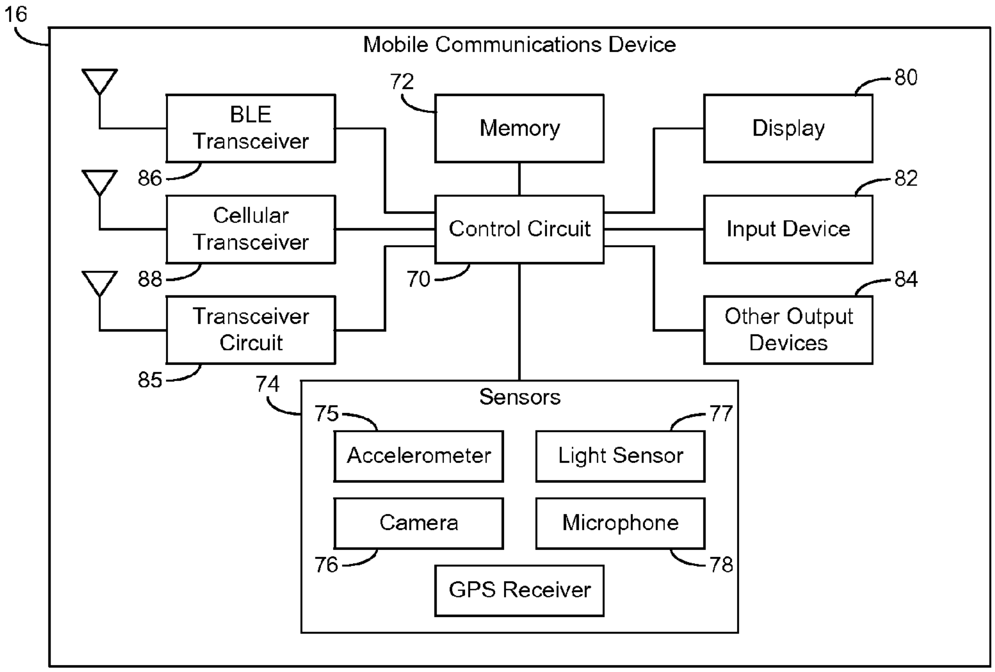
FIG. 4 illustrates an exemplary embodiment of the components included in a mobile communications device.

Referring now to FIG. 4, an exemplary embodiment of a mobile communications device is illustrated. The mobile communications device 16, which may communicate with the trainable transceiver 10 in some embodiments of the trainable transceiver 10, may be a device purchased by a consumer separately from the trainable transceiver 10. For example, the mobile communications device 16 may be a cellular telephone purchased from a third party retailer. In some embodiments, the mobile communications device 16 (e.g., smartphone, tablet, cellular telephone, laptop, key fob, dongle, etc.) includes a control circuit 70. The control circuit 70 may contain circuitry, hardware, and/or software for facilitating and/or performing the functions described herein. The control circuit 70 may handle inputs, process inputs, run programs, handle instructions, route information, control memory, control a processor, process data, generate outputs, communicate with other devices or hardware, and/or otherwise perform general or specific computing tasks. In some embodiments, the control circuit 70 includes a processor. In some embodiments, the control circuit 70 includes memory. The control circuit 70 may handle computation tasks associated with placing phone calls, running an operating system, running applications, displaying information, general computing, and/or tasks associated with providing smartphone, tablet, laptop and/or other device functions. In some embodiments, the control circuit 70 may include and/or be one more systems on a chip (SoCs), application specific integrated circuits (ASICs), one or more field programmable gate arrays (FPGAs), a digital-signal-processor (DSP), a group of processing components, and/or other suitable electronic processing components.

The mobile communications device 16 may include memory 72. Memory 72 is one or more devices (e.g. RAM, ROM, Flash Memory, hard disk storage, etc.) for storing data and/or computer code for facilitating the various processes described herein. Memory 72 may be or include non-transient volatile memory or non-volatile memory. Memory 72 may include database components, object code components, script components, or any other type of information structure for supporting various activities and information structures described herein. Memory 72 may be communicably connected to the control circuit 70 and provide computer code and/or instructions to the control circuit 70 for executing the processes described herein. For example, memory 72 may contain computer code, instructions, and/or other information of implementing an operating system, one or more applications, and/or other programs.

In some embodiments, the mobile communications device 16 includes one or more sensors 74. The sensors 74 may be controlled by the control circuit 70, provide inputs to the control circuit 70, and/or otherwise interact with the control circuit 70. In some embodiments, sensors 76 include one or more accelerometers 75, cameras 76, light sensors 77, microphones 78, and/or other sensors or input devices. Sensors may further include a global positioning system (GPS) receiver 79. The GPS receiver 79 may receive position information from another source (e.g., a satellite). The position may be based on GPS coordinates.

The mobile communications device may include output devices. In some embodiments, the output devices are controlled by the control circuit 70, provide input to the control circuit 70, communicate output from the control circuit 70 to a user or other device, and/or are otherwise in communication with the control circuit 70. Output devices may include a display 80. The display 80 allows for visual communication with a user. The display 80 may be configured to output a visual representation based on computer instructions, control signals, computer code, frame buffers, and/or other electronic signals or information. In some embodiments, the display 80 includes a graphics processing unit (GPU), controller, and/or other hardware to facilitate the handling of and display of graphics information. In other embodiments, the display 80 does not include hardware for processing images or image data. The display 80 may be any hardware configured to display images using the emission of light or another technique. For example, the display 80 may be a liquid crystal display, e-ink display, plasma display, light emitting diode (LED) display, or other display device. In some embodiments, the display 80 may be part of or otherwise integrated with a user input device 82 such as a touchscreen display (e.g., projected capacitance touchscreen, resistance based touchscreen, and/or touchscreen based on other touch sensing technology). The display 80 be a touchscreen display. The mobile communications device may include other output devices 84. Output devices may also include a speaker for providing audio outputs. Output devices may further include a flash. A flash may be associated with a camera and may be an LED or other light source.

The mobile communications device 16 may include a transceiver circuit 85. The transceiver circuit 85 may be a radio frequency transceiver, cellular transceiver, and/or other transceiver. The transceiver circuit 85 may provide communication between the mobile communication device and a cell tower, voice network, data network, communication network, other device, and/or other hardware components used in communication. The mobile communications device 16 may access the internet and/or other networks using the transceiver circuit 85. In some embodiments, the trainable transceiver 10 and mobile communications device 16 communicate using the transceiver circuit 85 of the mobile communications device 16 and the transceiver circuit 26 of the trainable transceiver 10. Other intermediary devices and/or hardware (e.g., network components) may facilitate communication between the mobile communications device 16 and the trainable transceiver 10. In some embodiments, the mobile communications device 16 may have access to activation signal parameters, training information (e.g., device identification information), and/or other information related to a home electronics device and/or remote device. The mobile communications device 16 may have access to this information through a variety of sources and techniques as discussed in more detail herein. The mobile communications device 16 may transmit activation signal parameters, training information (e.g., device identification information), and/or other information related to a home electronics device and/or remote device using the transceiver circuit 85 of the mobile electronics device 16. This information may be received by the trainable transceiver 10 using the transceiver circuit 26 of the trainable transceiver 10.

In some embodiments, the mobile communications device 16 includes an NFC transceiver. The NFC transceiver may allow the mobile communications device to wirelessly communicate with the trainable transceiver 10 using NFC. As discussed above, the NFC transceiver of the mobile communications device 16 and the NFC transceiver of the trainable transceiver may allow for wireless communication between the trainable transceiver 10 and the mobile communications device 16. In some embodiments, the wireless communication via the NFC transceivers allows for the trainable transceiver 10 and mobile communications device 16 to be paired and therefore allow for further communication using the NFC transceivers and/or other transceivers described herein.

In some embodiments, the mobile communications device 16 includes a BLE transceiver 86. The BLE transceiver 86 may allow the mobile communications device 16 to wirelessly communicate with the trainable transceiver 10 using a Bluetooth protocol such as BLE. As discussed above, the BLE transceiver 86 of the mobile communications device 16 and the BLE transceiver of the trainable transceiver 10 may allow for wireless communication between the trainable transceiver 10 and the mobile communications device 16. In some embodiments, the wireless communication via the BLE transceivers allows for the trainable transceiver 10 and mobile communications device 16 to be paired and therefore allow for further communication using the BLE transceivers and/or other transceivers described herein. Alternatively, the trainable transceiver 10 and the mobile communications device 16 may be paired by another technique (e.g., using the NFC transceivers) which allows for further communication using BLE transceivers In further embodiments, the mobile communications device 16 includes a WiFi transceiver.

Referring generally to FIGS. 1-4, the mobile communications device 16 may include an application configured to interact with the mobile communications device 16 and the trainable transceiver 10. For example, the application may control a transceiver of the mobile communications device 16 for the function of communicating with the trainable transceiver 10. The application may facilitate communication between the mobile communications device 16 and the trainable transceiver 10, allow a user to configure or train the trainable transceiver 10, be used to acquire activation signal parameters stored locally (e.g., with the application in memory) and/or remotely (e.g., on a server accessible to the application using a connection to the internet provided by the mobile communications device 16), be used to transmit activation signal parameter to the trainable transceiver 10, and/or perform other functions described herein with respect to the mobile communications device 16 and/or trainable transceiver 10.

In some embodiments, the trainable transceiver 10 may access the internet using a communications connection with the mobile electronics device 16. For example, the trainable transceiver 10 may transmit requests, control instructions, and/or other information to the mobile communications device 16 causing the mobile communications device to access information, send information, and/or otherwise retrieve information using an internet connection (e.g., through a cellular transceiver 88 and/or other transceiver). The mobile communications device 16 may transmit the resulting information and/or data to the trainable transceiver 10. The mobile communications device 16 may serve as intermediary device which is used by the trainable transceiver 10 to communicate with other devices (e.g., servers, networking equipment, other mobile communications device, home electronics devices, remote devices, and/or other devices). In some embodiments, the trainable transceiver 10 may use the mobile communications device 16 to retrieve activation signal parameters, training information (e.g., device identification information), and/or other information related to a home electronics device and/or remote device. Using access to the internet and/or otherwise using the mobile communications device 16, the trainable transceiver may access the cloud computing system 18 (e.g., IP addressable servers, a cluster of computers, etc.).

Figure 5A:
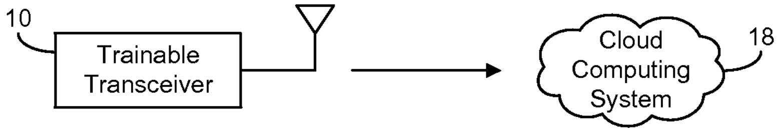
FIG. 5A illustrates an exemplary embodiment of a trainable transceiver in communication with a cloud computing system computing system for transmitting information to the cloud computing system.
Figure 5B:
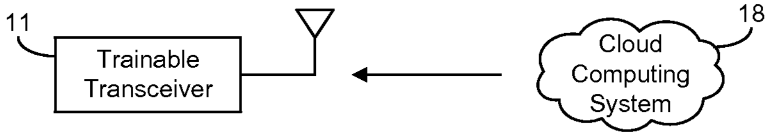
FIG. 5B illustrates an exemplary embodiment of a trainable transceiver in communication with a cloud computing system for receiving information from the cloud computing system.

Referring now to FIGS. 5A-5B, a trainable transceiver may be in communication with the cloud computing system (e.g., a cloud computing system based computer system architecture for storing, managing, and/or communicating information as described in more detail with reference to FIG. 7). In one embodiment, the communication between the trainable transceiver 10 is unidirectional with the trainable transceiver 10 being configured to transmit information to the cloud computing system 18. Information may include activation signal parameters, training information, status information, notifications, diagnostic information, and/or other information related to a home electronics device, remote device, and/or other device. For example, the trainable transceiver 10 may transmit activations signal parameters and device identification information corresponding to a particular home electronics device (e.g., a garage door opener) using a cellular transceiver. In some embodiments, the trainable transceiver 10 transmits information to the cloud computing system 18 using, in part, the internet. For example, the trainable transceiver 10 may use a client, a web browser, an internet protocol, and/or other internet communication technique in conjunction with internet access (e.g., provided by a cellular transceiver) to communicate information to the cloud computing system 18. The cloud computing system 18 may receive information transmitted by the trainable transceiver 10 using internet connected hardware. The cloud computing system 18 may include a server with a connection to the internet. The cloud computing system 18 may include further hardware and/or software which facilitates reception of information from the trainable transceiver 10 (e.g., as discussed with reference to FIG. 7). In other embodiments, the communication between the trainable transceiver 10 and the cloud computing system 18 is unidirectional with the trainable transceiver 10 receiving information (e.g., activation signal parameters, training information, status information, and/or other information related to a home electronics device, remote device, and/or other device) from the cloud computing system 18 in one embodiment.

In still further embodiments, the communication between the trainable transceiver 10 and the cloud computing system 18 may be bi-directional. For example, the trainable transceiver may both send information to the cloud computing system 18 and receive information from the cloud computing system 18. Sending and receiving information may occur contemporaneously. In other embodiments, the trainable transceiver 10 may transmit information to the cloud computing system 18 without receiving information in return. At a later time, the trainable transceiver 10 may receive information from the cloud computing system 18.

Figure 6A:
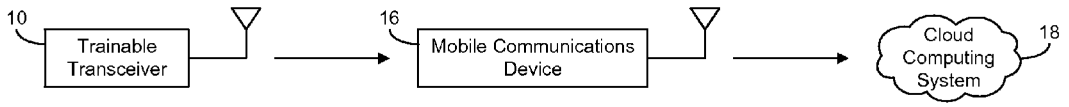
FIG. 6A illustrates an exemplary embodiment of a trainable transceiver in communication with a cloud computing system for transmitting information to the cloud computing system using a mobile communications device.
Figure 6B:
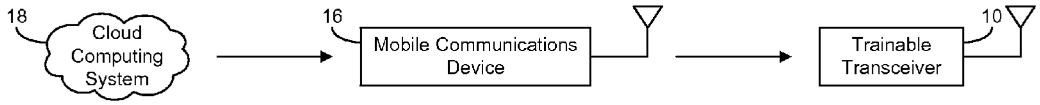
FIG. 6B illustrates an exemplary embodiment of a trainable transceiver in communication with a cloud computing system for receiving information from the cloud computing system using a mobile communications device.

Referring now to FIGS. 6A and 6B, the trainable transceiver 10 may communicate with the cloud computing system 18 using an intermediate device. In one embodiment, the intermediate device is a mobile communications device 16. The trainable transceiver 10 may not include hardware for connecting to the internet. The trainable transceiver 10 may have hardware for communicating with a mobile communications device as described with reference to FIGS. 1-4. For example, the trainable transceiver 10 may include a Bluetooth transceiver which the trainable transceiver 10 uses to communicate with the mobile communications device 16 having a Bluetooth transceiver. The mobile communications device 16 may have hardware with which the mobile communications device 16 can access the internet and/or another network. For example, the mobile communications device 16 may include a cellular transceiver used to connect to a voice and/or data network. The mobile communications device 16 may access the internet. Using access to the internet and/or access to a network to which the cloud computing system 18 is configured to communicate, the mobile communications device 16 may communicate with the cloud computing system 18.

Referring now to FIG. 6A, the trainable transceiver 10 may have access to the cloud computing system 18 by communicating with the mobile electronics device 16. For example, the trainable transceiver 10 may send instructions and/or information to the mobile communications device 16 which the mobile communications device 16 further transmits to the cloud computing system 18. The instructions and/or information transmitted by the trainable transceiver 10 to the mobile communications device 16 may cause the mobile communications device 16 to further communicate with the cloud computing system 18. The mobile communications device 16 may act as a repeater, retransmitted, and/or other device for forwarding communications. The combination of the trainable transceiver 10 and mobile communications device 16 may provide for one or more of the functions described with reference to FIG. 5A above. The mobile communications device 16 may function solely as hardware used by the trainable transceiver 10 to access the internet in some embodiments. In other words, the mobile communications device 16 and its communication with the trainable transceiver 10 may take the place of a transceiver of the trainable transceiver 10 for purposes of communicating with the cloud computing system 18.

Referring now to FIG. 6B, the trainable transceiver 10 may receive information (e.g., configuration information, activation signal parameters, training information, status information, etc.) from the cloud computing system 18 using an intermediate mobile communications device 16. For example, the cloud computing system 18 may send instructions and/or information to the mobile communications device 16 which the mobile communications device 16 further transmits to the trainable transceiver 10. The instructions and/or information transmitted by the cloud computing system 18 to the mobile communications device 16 may cause the mobile communications device 16 to further communicate with the trainable transceiver 10. The mobile communications device 16 may act as a repeater, retransmitted, and/or other device for forwarding communications. The combination of the trainable transceiver 10 and mobile communications device 16 may provide for one or more of the functions described with reference to FIG. 5B above. The mobile communications device 16 may function solely as hardware used by the trainable transceiver 10 to access the internet in some embodiments. In other words, the mobile communications device 16 and its communication with the trainable transceiver 10 may take the place of a transceiver of the trainable transceiver 10 for purposes of communicating with the cloud computing system 18.

Figure 6C:
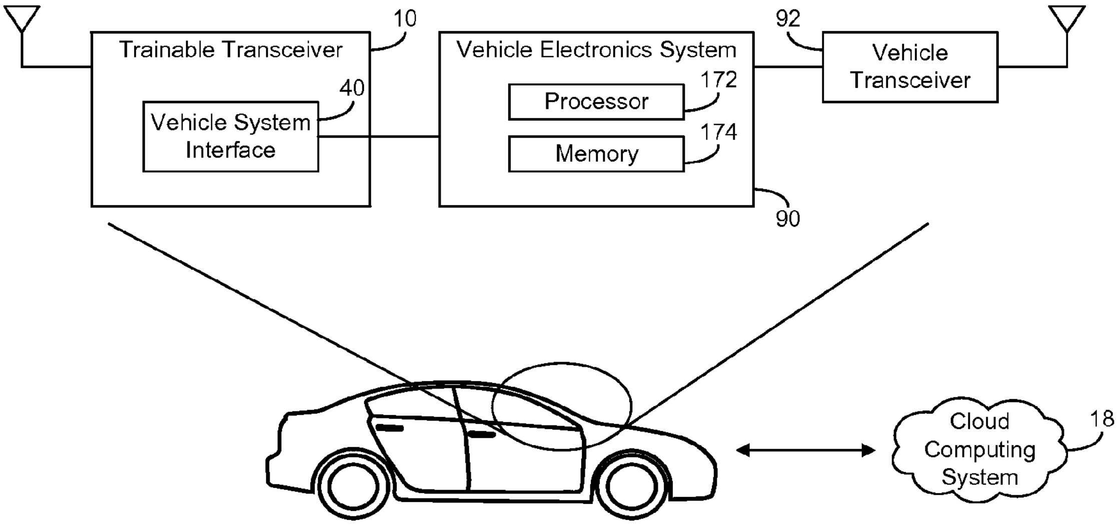
FIG. 6C illustrates an exemplary embodiment of a trainable transceiver communicating with a cloud computing system using a vehicle transceiver.

In other embodiments, the trainable transceiver 10 may communicate with the cloud computing system 18 using additional and/or other intermediate devices or hardware. For example, the trainable transceiver 10 may be coupled to or otherwise have access to a transceiver 92 included in a vehicle electronics system 90 as depicted in FIGS. 6C and 12A-12B. Using the transceiver 92 (e.g., a cellular transceiver such as a transceiver configured to communicate with a voice and/or data cell network) included in the vehicle electronics system 90, the trainable transceiver 10 may have access to internet through which the trainable transceiver 10 may communicate with the cloud computing system 18. In other embodiments, the trainable transceiver 10 may be in communication with a transceiver included in a rear view mirror. The trainable transceiver 10 may use the transceiver of the rear view mirror to access the internet for purposes of communicating with the cloud computing system 18 and/or otherwise use the transceiver to communicate with the cloud computing system 18.

Figure 7:
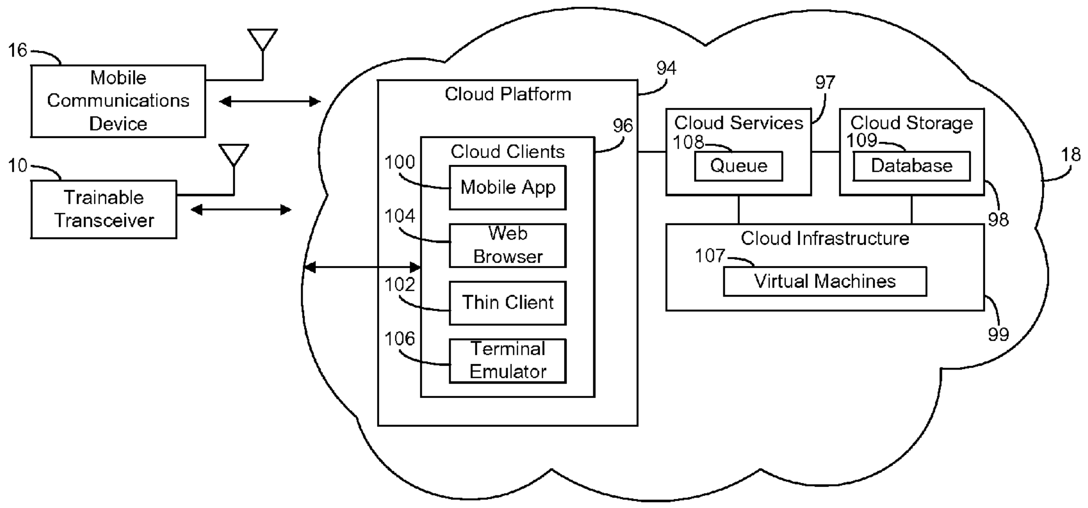
FIG. 7 illustrates an exemplary embodiment of components included in a cloud computing system.

Referring now to FIG. 7, a block diagram of an exemplary embodiment of a cloud computing system 18 is illustrated. The cloud computing system 18 may include one or more cloud computing system platforms 94. The cloud computing system platform 94 may be hardware and/or software which provides an interface for communicating with the cloud computing system 18. For example, the cloud computing system platform 94 may be or include a sever(s) for handling communication with the cloud computing system 18 via a web browser running on remote hardware (e.g., a trainable transceiver). The cloud computing system platform 94 may allow communication between hardware and/or software of the cloud computing system 18 and the trainable transceiver 10 and/or the mobile communications device 16 using one or more of the techniques described with reference to FIGS. 5A-6B and/or described herein.

The cloud computing system platform 94 may further include one or more cloud computing system clients 96 used in communicating with the cloud computing system. Cloud computing system clients 96 may be software and/or hardware used for communicating with a corresponding cloud computing system client (e.g., program, application, web browser, etc.) running on a remote device. For example, the trainable transceiver 10 may run a web browser which navigates to a web site hosted by hardware (e.g., a server) included in the cloud computing system 18. The cloud computing system client 96 may be software running on the server for the purposes of hosting, serving, and/or otherwise allowing the web browser to communicate with the cloud computing system 18 (e.g., cloud computing system services 97, cloud computing system storage 98, cloud computing system infrastructure 99, and/or hardware or software implementing the same). In some embodiments, the web browser cloud computing system client 104 may be or include a web platform used in communication between the cloud computing system 18 and other devices (e.g., the mobile communications device 16 and/or the trainable transceiver 10). In some embodiments, the web browser running on the device only handles inputs and outputs with the cloud computing system 18 performing all other computing tasks. For example, the web browser may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the web browser on the device for display using the hardware of the device. The web browser cloud computing system client 104 may run on the trainable transceiver 10, mobile communications device 16, and/or other device remote from the cloud computing system 18 with a corresponding cloud computing system client 96 and/or the cloud computing system platform 98 facilitating communication between the cloud computing system and 18 the device (e.g., routing communication, formatting information, serving information, receiving information, sending instructions, formatting instructions, communicating with other cloud computing system components, etc.). The web browser running on the device may allow communication with a cloud computing system application or service (e.g., running on cloud computing system hardware such as a server).

In some embodiments, the cloud computing system clients 96 include a mobile application 100. The trainable transceiver 10, mobile communications device 16, and/or other device may include a mobile application (e.g., program) running thereon. The mobile application 100 may be configured to format instructions and/or information for transmission to the cloud computing system 18. The information and/or instructions may be receive by the cloud computing system 18 using a corresponding cloud computing system client (e.g., hardware such as a server, software for handling inputs, etc.) corresponding to the mobile application 100. The mobile application running on the device may further be configured to interpret, handle, process, display, and/or otherwise manipulate instructions and/or information received from the corresponding cloud computing system client. In some embodiments, the mobile application running on the device only handles inputs and outputs with the cloud computing system 18 performing all other computing tasks. For example, the mobile application may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the mobile application on the device for display using the hardware of the device. The mobile application 100 cloud computing system client may run on the trainable transceiver 10, mobile communications device 16, and/or other device remote from the cloud computing system 18 with a corresponding cloud computing system client 96 and/or the cloud computing system platform 94 facilitating communication between the cloud computing system 18 and the device (e.g., routing communication, formatting information, serving information, receiving information, sending instructions, formatting instructions, communicating with other cloud computing system components, etc.). The mobile application running on the device may allow communication with a cloud computing system application or service (e.g., running on cloud computing system hardware such as a server).

In some embodiments, the cloud computing system clients include a thin client 102. The trainable transceiver 10, mobile communications device 16, and/or other device may include a thin client running thereon and/or otherwise implement a thin client. The trainable transceiver 10 is a thin client in some embodiments. The thin client 102 may be configured to format instructions and/or information for transmission to the cloud computing system 18. The information and/or instructions may be receive by the cloud computing system 18 using a corresponding cloud computing system client (e.g., hardware such as a server, software for handling inputs, etc.) corresponding to the thin client 102. The thin client 102 may further be configured to interpret, handle, process, display, and/or otherwise manipulate instructions and/or information received from the corresponding cloud computing system client 96. In some embodiments, the thin client only handles inputs and outputs with the cloud computing system 18 performing all other computing tasks. For example, the thin client may display images according to a frame buffer received from the cloud computing system 18 and transmit input information to the cloud computing system 18 with the cloud computing system 18 handling or processing the inputs, performing computational tasks based on the inputs, and/or generating a frame buffer which is transmitted to the thin client for display using the hardware of the thin client and/or the device on which the thin client is running. The thin client cloud computing system client 102 may run on a trainable transceiver, mobile communications device, and/or other device remote from the cloud computing system with a corresponding cloud computing system client and/or the cloud computing system platform facilitating communication between the cloud computing system and the device (e.g., routing communication, formatting information, serving information, receiving information, sending instructions, formatting instructions, communicating with other cloud computing system components, etc.). Alternatively, the device may be a thin client. The thin client may allow communication with a cloud computing system 18 application or service (e g, running on cloud computing system hardware such as a server). In other embodiments, the cloud computing system clients 96 may be and/or include a terminal emulator 106.

In some embodiments, the cloud computing system 18 includes cloud computing system services 97. Cloud computing system services 97 may be implemented using hardware and/or software included in the cloud computing system. For example, cloud computing system services 97 may be implemented as one or more programs running on one or more servers. The hardware used to provide cloud computing system services 97 may be connected to other hardware included in the cloud computing system 18. For example, a first server running a program for providing a cloud computing system service (e.g., computational tasks based on user input) may communicate with a second server used to implement a cloud computing system platform and/or cloud computing system client for communicating with a remote device (e.g., mobile communications device 16, trainable transceiver 10, etc.).

Cloud computing system services 97 may include software as a service, platform as a service, infrastructure as a service, and/or other service models. The services proved by cloud computing system services 97 may be used to implement the functions of the trainable transceiver systems described herein. For example, cloud computing system services 97 may be used to store, allow manipulation of, and/or provide access to information related to the trainable transceiver systems described herein. For example, this information may include activation signal parameters, training information, status information, notifications, diagnostic information, profile configurations and/or information, configuration information, identification information, and/or other information related to a home electronics device, remote device, trainable transceiver, vehicle, mobile communications device, and/or other device. Cloud computing system services 97 may include other services besides information storage, access, and editing. For example, cloud computing system services 97 may be used to facilitate communication between two or more devices as described herein (e.g., using cloud computing system hardware). Other cloud computing system services are possible and maybe used to facilitate and/or perform the functions described herein.

In some embodiments, inputs to cloud computing system services 97 may be received by cloud computing system services hardware and/or software from hardware and/or software in communication with the trainable transceiver 10, mobile communications device 16, and/or other device. For example, hardware and/or software implementing a cloud computing system platform and/or cloud computing system client may communicate with hardware implementing cloud computing system services. In this way, a cloud computing system platform 94 and/or client 96 may receive an input from a mobile communications device 16, trainable transceiver 10, or other device and forward the input to cloud computing system 18 services hardware for processing. The mobile communications device 16, trainable transceiver 10, and/or other device may generate the input sent to the cloud computing system platform 94 and/or cloud computing system client 96 in response to a user input received by the device (e.g., a button press). Thus, a user input received at a mobile communications device 16, trainable transceiver 10, and/or other device may be processed by a cloud computing system 18 service. Communication may be between two or more servers using the internet and/or other networks and/or communication protocols. Similar communication techniques may be used to provide an output from cloud computing system 18 services to one or more mobile communications device 16, trainable transceiver 10, and/or other device. In further embodiments, a home electronics device, remote device, and/or other device is in communication with the cloud computing system 18 using the same or similar communication techniques. The cloud computing system 18 may be configured to receive inputs from and/or provide outputs to home electronics device, remote device, and/or other device in addition to mobile communications device 16, trainable transceiver 10, and/or other devices. In further embodiments, inputs and/or outputs may be based on information, instructions, events, and/or other sources or conditions which are not triggered directly and/or indirectly by user input. For example, a home electronics device may communicate status information to the cloud computing system 18 on a periodic basis.

In some embodiments, cloud computing system 18 services includes a queue 108 and/or other information traffic handling, prioritization, and/or routing software and/or hardware. The queue 108 and/or other hardware and/or software may be used to handle inputs to and/or outputs from cloud computing system 18 service. Other functions may include retrieving information from other cloud computing system 18 hardware, handling information requests, and/or otherwise performing arbitration tasks, networking tasks, information processing tasks, task managing tasks, and/or other functions.

In some embodiments, the cloud computing system includes cloud computing system storage 98. Cloud computing system storage 98 may be or include memory for storing information and/or data. The memory included in cloud computing system storage 98 may be located in or on a server. The server may be distinct from servers implementing other components of the cloud computing system 18. For example, the server implementing cloud computing system storage 98 may be a separate server in communication with another server implementing cloud computing system 18 services. Memory may be one or more devices (e.g. RAM, ROM, Flash Memory, hard disk storage, etc.) for storing data and/or computer code for facilitating the various processes described herein. Memory may be or include non-transient volatile memory or non-volatile memory. Memory may include database components, object code components, script components, or any other type of information structure for supporting various activities and information structures described herein.

In some embodiments, cloud computing system storage 98 may include one or more databases 109. Databases 109 may be created, maintained, manipulated, stored on, and/or otherwise implemented using memory included in cloud computing system storage 98. The database(s) 109 may contain information such as include activation signal parameters, training information, status information, notifications, diagnostic information, profile configurations and/or information, configuration information, identification information, and/or other information related to a home electronics device, remote device, trainable transceiver, vehicle, mobile communications device, and/or other device. The database 109 may store information indexed to a particular device, particular user, particular configuration profile, and/or otherwise indexed. For example, activation signal parameters may be stored in a database 109 as a tuple including device identification information for which the activation signal parameters correspond. In some embodiments, a unique database 109 or group of databases 109 may be stored for each trainable transceiver and/or a particular user having one or more trainable transceiver. Different data storage architectures are possible.

In some embodiments, the cloud computing system includes cloud computing system infrastructure 99. Cloud computing system infrastructure 99 may include hardware and/or software for implementing the functions described herein. For example, cloud computing system infrastructure 99 may include one or more servers and/or software for running the servers (e.g., managing programs running on the server, communicating with other servers or hardware, etc.). A cloud computing system 18 component may be implemented with one or more servers. For example, each cloud computing system 18 component (e.g., cloud computing system platform 94, cloud computing system 97 services, cloud computing system storage 98, etc.) may be a single server. Alternatively, a cloud component may be implemented with a plurality of servers. For example, information may be stored across a plurality of servers implementing cloud computing system storage 98. Cloud computing system infrastructure 99 may include virtual machines 107, load balances, networks, and/or other components. For example, virtual machines 107 may be implemented to emulate a computer for use in facilitating the functions of the trainable transceiver system described herein. The cloud computing system infrastructure 99 may facilitate communication between cloud computing system components and/or between cloud computing system components and other devices (e.g., a trainable transceiver, mobile communications device, and/or other device).

Figure 8A:
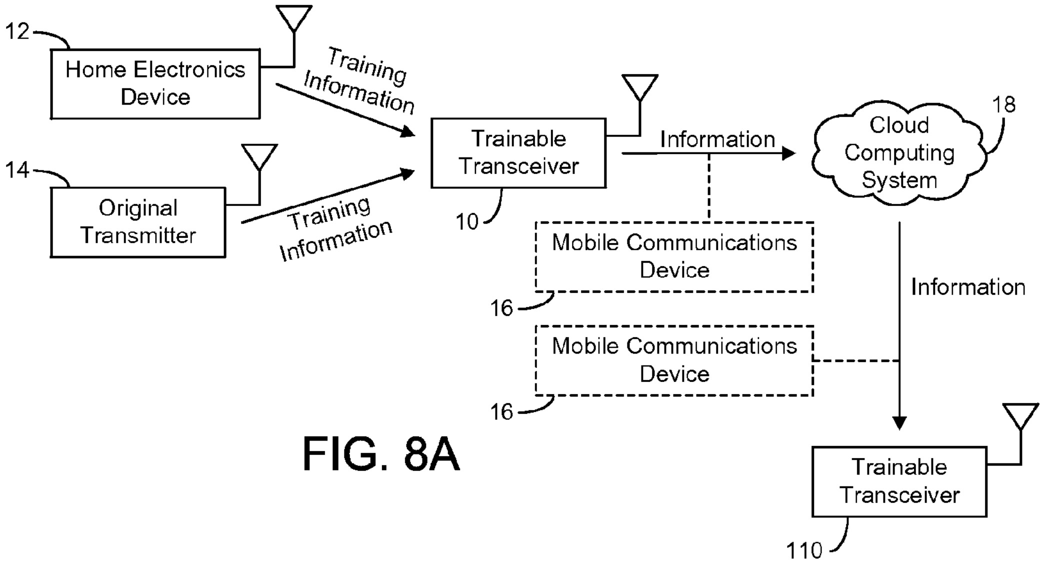
FIG. 8A illustrates an exemplary embodiment of two trainable transceivers in communication with a cloud computing system.

Referring now to FIG. 8A, a cloud computing system 18 may receive information related to a home electronics device 12, remote device, trainable transceiver 10, vehicle, mobile communications device 16, and/or other device. This information may include activation signal parameters, training information, status information, notifications, diagnostic information, profile configurations and/or information, configuration information, identification information, and/or other information related to a home electronics device 12, remote device, trainable transceiver 10, vehicle, mobile communications device 06, and/or other device. The cloud computing system 18 may receive this information and/or other information from a variety of sources using one or more of the communication techniques described here.

In some embodiments, the cloud computing system 18 may receive information such as activation signal parameters, training information, and/or other information from a trainable transceiver 10. One or more of the communication techniques discussed with reference to FIGS. 5A-6C may be used in order to communicate information from the trainable transceiver 10 to the cloud computing system 18. In some embodiments, the trainable transceiver 10 receive activation signal parameters, training information (e.g., device identification information), and/or other information from the home electronics device 12, remote device, and/or other device. This information may then be forwarded to the cloud computing system 18. For example, the trainable transceiver 10 may receive status information (e.g., a garage door is closed) from the home electronics device 12. In other embodiments, the trainable transceiver 10 may indirectly receive activation signal parameters, training information (e.g., device identification information), and/or other information from the home electronics device 12, remote device, and/or other device. For example, the trainable transceiver 10 may receive information during a training process. The training process may be or include components such as a user entering information about the device into the trainable transceiver 10 (e.g., make, model, serial number, etc.), the trainable transceiver 10 receiving information from the mobile communications device 16, the trainable transceiver 10 acquiring information based on an image of the original transmitter 14, the trainable transceiver 10 acquiring information based on a machine readable image, the trainable transceiver 10 acquiring information from a server, and/or the trainable transceiver 10 otherwise acquiring the information. In further embodiments, the trainable transceiver 10 may acquire information from a signal received from the original transmitter 14. For example, the trainable transceiver 10 may receive a signal from the original transmitter 14 using a transceiver circuit. The trainable transceiver 10 may then analyze the signal received (e.g., using a control circuit) to determine information such as activation signal parameters, training information, and/or other information related to the home electronics device 12, remote device, and/or other device associated with the original transmitter 14.

In some embodiments, the cloud computing system 18 may receive information such as activation signal parameters, training information, and/or other information from the home electronics device 12, remote device, and/or other device. One or more of the communication techniques discussed with reference to FIGS. 5A-6C may be used in order to communicate information from the device to the cloud computing system 18. For example, the home electronics device 12 may be connected to the internet (e.g., with a wired connection, wireless connection using WiFi, and/or other connection of network equipment configured to access the internet). Using internet access and/or a cloud computing system client, the device may transmit information and/or otherwise communicate with the cloud computing system 18. For example, a garage door opener may send device status to the cloud computing system 18 (e.g., garage door is open), activation signal parameters corresponding to the garage door opener, device identification information, and/or other information.

In some embodiments, the cloud computing system 18 may receive information from another source running a cloud computing system client. For example, a user may access the cloud computing system 18 (e.g., use a cloud computing system service) and/or otherwise communicate with cloud computing system 18 using a device such as the mobile communications device 16, a personal computer, a vehicle infotainment system, and/or another device running a cloud computing system client. The user may provide information to the cloud computing system 18 using such a device. For example, a user may provide activation signal parameters, training information, and/or other information from the trainable transceiver 10. This may include actions such as a user entering information in a web browser. For example, a user may select from a list of devices presented by the cloud computing system platform and the cloud computing system 18 may use the received information to determine and/or retrieve from a database activation signal parameters, training information, and/or other information corresponding to the user selected device.

Figure 8B:
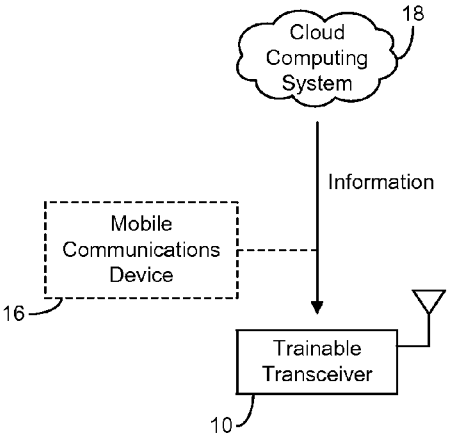
FIG. 8B illustrates an exemplary embodiment of a trainable transceiver receiving information from a cloud computing system while in a copy mode.

Referring generally to FIGS. 8A-8B, the transfer of information between devices and the cloud computing system 18 and/or the cloud computing system 18 and devices may be initiated, controlled by, or otherwise include additional devices. For example, the mobile communications device 16 may facilitate communication between the cloud computing system 18 and a device as previously discussed with reference to FIGS. 6A-6B. This is illustrated in the figures with the mobile communications device 16 pictured with a dashed line. Similarly, other hardware such as a vehicle transceiver may facilitate communication between the cloud computing system 18 and the trainable transceiver 10 or 110 (e.g., as described with reference to FIG. 6C).

In some embodiments, copy mode, recall of information, and/or other transfer of information between the trainable transceiver 10 and the cloud computing system 18 is controlled by a trainable transceiver. Control of these functions may be performed using hardware and/or software local to the trainable transceiver 10 and may include using a cloud computing system client and/or platform (e.g., an application client running on the trainable transceiver). For example, a user may provide an input on the trainable transceiver 10 causing the trainable transceiver 10 to transmit information to the cloud computing system 18. Similarly, a user may provide an input on the same trainable transceiver 10 or the second trainable transceiver 110 to receive information from the cloud computing system 18 (e.g., send a request signal to the cloud computing system 18 resulting in the reception of information). In some embodiments, the mode of the trainable transceiver 10, the type of copy mode to be used when transferring information, devices for which information is to be transferred, and/or other settings or options related to transferring information to or from the cloud computing system 18 are set using inputs received by the trainable transceiver 10. For example, a user may provide an input to request information from the cloud computing system 18. The cloud computing system 18 may provide a list of devices for which information may be received. This list may be displayed to a user by the trainable transceiver 10. The user may then select the devices for which information is desired (e.g., which devices the user wants the trainable transceiver 10 trained to control). The trainable transceiver 10 may send a request transmission based on this selection to the cloud computing system 18 which transmits information in response to the request transmission. In further embodiments, the transfer of information is not based on a user input. For example, the cloud computing system 18 may automatically transmit information upon the occurrence of an event (e.g., the trainable transceiver 10 establishes communication with the cloud computing system 18), periodically (e.g., daily at a particular time), and/or otherwise transmit information without first receiving a user input. Similarly, the trainable transceiver 10 may automatically transmit information to the cloud computing system 18.

In the above discussion, embodiments were discussed in which the trainable transceiver 10 is used to control copy mode, recall of information, and/or other transfer of information between the cloud computing system 18 and another device. In some embodiments, other devices perform the above described control functions. For example, the mobile communications device 16 may perform control functions. A user may provide inputs to the mobile communications device 16 for controlling the transmission of data. The mobile communications device 16 may forward the inputs to the trainable transceiver 10 which then implement the control functions as described above. Alternatively, the mobile communications device 16 may include a cloud computing system client (e.g., mobile application) which handles user input and transmits user input to the cloud computing system 18 for controlling the transmission of data. In further embodiments, a personal computer and/or other device having a cloud computing system client may control the transmission of data in the above described manner. For example, a user may provide an input to a cloud computing system client on personal computer which causes the information from the trainable transceiver 10 to be transmitted to the cloud computing system 18 and causes the cloud computing system 18 to transmit the information to the second trainable transceiver 110. The user, through the cloud computing system client, may control such parameters as which trainable transceiver transmits the information, which trainable transceiver receives the information, to which device the information relates, and/or otherwise control the transfer of information using the cloud computing system 18.

Figure 9:
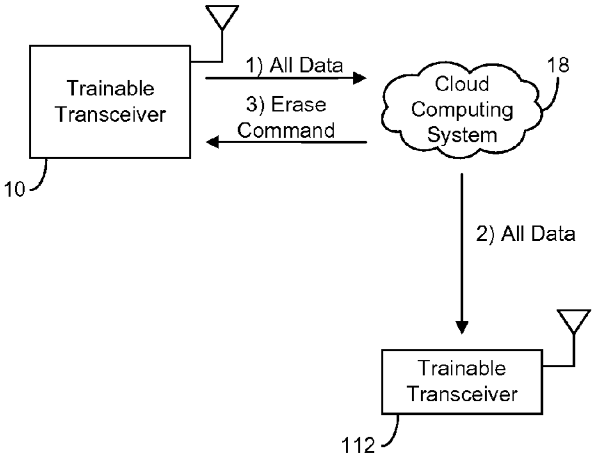
FIG. 9 illustrates an exemplary embodiment of a trainable transceiver receiving information from a cloud computing system according to a transfer mode.

Referring now to FIG. 9, a trainable transceiver may recall information from a cloud computing system while in a transfer mode. Recalling information in a transfer mode may include receiving all the information corresponding to a second trainable transceiver 112 such that the trainable transceiver 112 receiving the information becomes a clone of the original trainable transceiver 10 (e.g., transceiver that is the source of the information). For example, a user may provide an input to the trainable transceiver 112, the cloud computing system 18 (e.g., via a cloud computing system client), and/or other device such that the trainable transceiver 112 enters transfer mode. This may result in the trainable transceiver 112 sending an information request to the cloud computing system 18. The cloud computing system 18 may then request all the data from the original trainable transceiver 10. The trainable transceiver 10 may transmit all the data to the cloud computing system 18. The cloud computing system 18 may then transmit this data to the second trainable transceiver 112 in transfer mode. The cloud computing system 18 may then send a command to the first trainable transceiver 10 causing the first trainable transceiver 10 to be erased. Alternative orders of the above described steps are possible. For example, the first trainable transceiver 10 may transmit the data to the cloud computing system 18, the cloud computing system 18 may then transmit an erase command to the trainable transceiver 10, and then the cloud computing system 18 may transmit the information to the second trainable transceiver 112 in transfer mode.

In some embodiments, all the data of a trainable transceiver is transferred to a second trainable transceiver using the transfer mode. For example, the data transferred may include a key (e.g., rolling code, seed, and/or other encryption information) for a device the first trainable transceiver 10 is trained to control. Transferring all the data may include copying the entire local memory of the first transceiver 10 and causing the local memory of the second trainable transceiver 112 to be written with the copied information. In other embodiments, only the information used to control the devices associated with the first transceiver 10 is transferred to the second transceiver 112. For example, the first transceiver 112 may transmit to the cloud computing system 18 all of the information used to format control signals for the devices the first trainable transceiver 10 is trained to control. The cloud computing system 18 may then transmit this information to the second trainable transceiver 112 (e.g., the transceiver in transfer mode). The second transceiver 112 may then use this information for formatting control signals to control the same devices. The first trainable transceiver 10 may then be erased.

Generally, a user may have an account for managing the functions described herein using the cloud computing system. For example, the account may be tied to a particular user name and password. Alternatively, the account may be tied to an identification (ID) such as a HomeLink ID. The ID may allow for multiple users to be associated with an account. The account may enable cloud computing system storage of information tied to the account. For example, the cloud computing system may store information such as activation signal parameters, training information, status information, notifications, diagnostic information, and/or other information related to home electronics device, remote devices, and/or other devices. The account may be used to keep a listing of all home electronics devices, remote devices, and/or other devices associated with the user(s) of the account. Devices may be added, modified, manages, deleted, and/or otherwise manipulated by a user via a cloud computing system client. Changes may be reflected on trainable transceivers associated with the account. For example, changes to a device may be automatically pushed to a trainable transceiver via one or more communication techniques discussed herein such that the trainable transceiver is updated in light of the user changes. Devices may be associated with individual users and/or trainable transceivers. A user may provide additional information related to a device via the cloud computing system client. For example, a user may provide location information for a user's home and/or devices for which the trainable transceiver is trained to control.

In some embodiments, the account allows the cloud computing system to store information related to one or more trainable transceivers, mobile communications devices, and/or other devices. For example, the cloud computing system may store device identification information, communication information, location information, and/or other information related to one or more devices. The home electronics devices, remote devices, and/or other devices for which a trainable transceiver is trained to control may be managed and/or otherwise altered via a cloud computing system client. For example, a user may add a new device to a trainable transceiver. The trainable transceiver may receive information from the cloud computing system in response such that the trainable transceiver is configured to control the newly added device (e.g., activation signal parameters and device identification information for the newly added device may be pushed to the trainable transceiver). A plurality of trainable transceivers may be managed. For example, a user may associate a particular trainable transceiver with one of a plurality of users with access to the account. Information may be transferred between trainable transceivers in response to a user command entered through the cloud computing system client. For example, a user may select the mode, copy or transfer, for which information is recalled from one trainable transceiver by another, select what devices are copied, and/or otherwise control the transfer of information. Other settings, configurations, information and/or other parameters of the trainable transceiver may be manipulated entered, provided, and/or changed by a user through an account implemented by the cloud computing system.

In one embodiment, a trainable transceiver may request information from the cloud computing system and receive information from the cloud computing system using an account or ID. For example, a user may enter his or her account ID or username and a password into a trainable transceiver. In response, the trainable transceiver may access the cloud computing system and transmit the account ID or username information to the cloud computing system. The cloud computing system may use the account ID, user name, and/or password to access configuration information, activation signal parameters, and/or other information stored for the account or username. The cloud computing system may transmit this and/or other information to the trainable transceiver. The trainable transceiver may store the information from the cloud computing system locally. The trainable transceiver may use the information from the cloud computing system in order to configure itself to control the device(s) associated with the information received. Thus, the trainable transceiver will be able to control one or more home electronics devices, remote devices, and/or other devices (e.g., format activation signals based on activation signal parameters and/or other information associated with the devices) based on the information stored in the cloud computing system an associated with the user's account ID and/or username.

In some embodiments, a user may change, using a cloud computing system client, the assignment of input devices for controlling devices. A user may assign activation signal parameters and/or other information corresponding to a home electronics device, remote device, and/or other device to a particular input device. For example, a user could assign activation parameters corresponding to a garage door opener to a first button of a trainable transceiver such that pressing the first button causes the trainable transceiver to transmit an activation signal to the garage door opener. Activation signal parameters form controlling a gate system could be assigned to a second button of the trainable transceiver such that pushing the second button causes the trainable transceiver to transmit an activation signal to the gate system.

Advantageously, a cloud computing system client and a cloud computing system based account may allow a newly purchased trainable transceiver and/or other transceiver to be quickly trained for a user's devices. For example, a user who purchases a new vehicle including a trainable transceiver may configure the trainable transceiver, using an account ID and/or user name, to control the user's devices. This may be done without leaving the dealership (e.g., at the location where the vehicle is purchased). As an additional example, a user borrowing a vehicle (e.g., a rental car, a friend's car, etc.) can quickly train the trainable transceiver therein, using the account ID and/or username, to operate the user's devices. Using the account and/or cloud computing system client a user could unassociated the rental trainable transceiver with the account thereby erasing the trainable transceiver in the borrowed vehicle.

Figure 10:
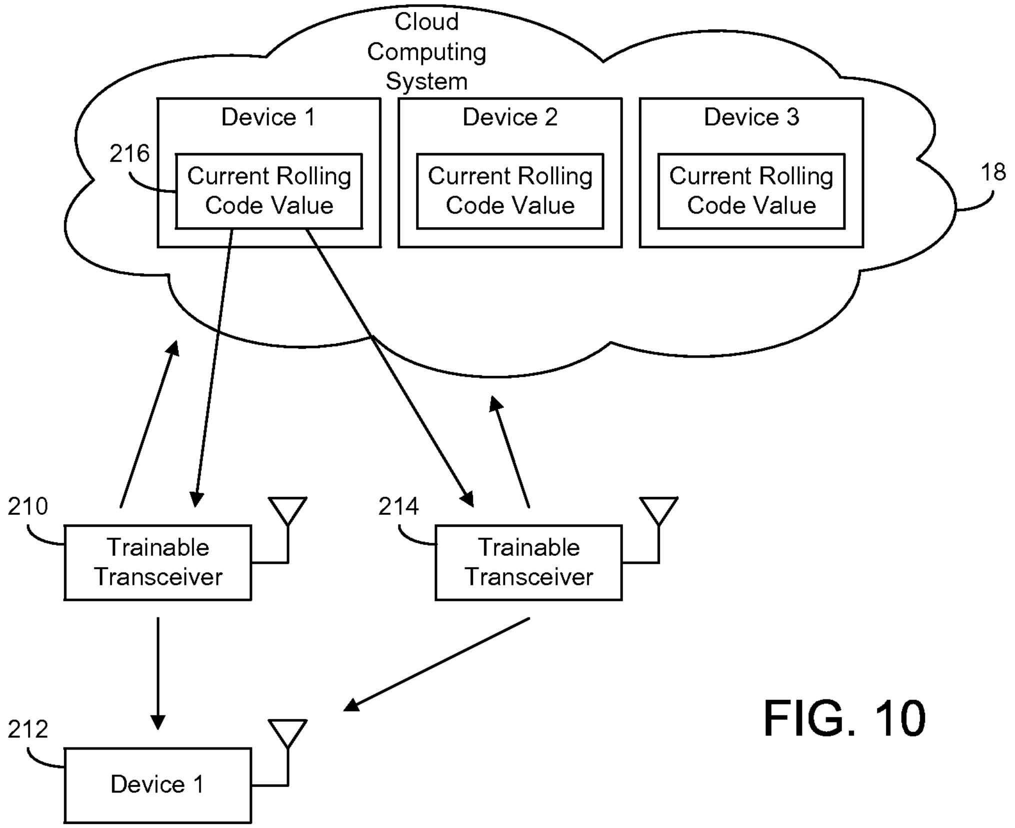
FIG. 10 illustrates an exemplary embodiment of a trainable transceiver system in which rolling code values are stored in a cloud computing system and provided to one or more trainable transceivers.

Referring now to FIG. 10, the cloud computing system 18 may be used to store encryption information such that a plurality of trainable transceivers may access the same encryption information. Advantageously, this may allow a plurality of trainable transceivers to work with the same device 212 as the plurality of trainable transceiver may share encryption information through the cloud computing system 18. For example, when a first trainable transceiver 210 transmits an activation signal using a rolling code value retrieved from the cloud computing system, the rolling code 216 may be advanced to a new rolling code value (e.g., roll value). When a second trainable transceiver 214 formats an activation signal for transmission to the same device 212, the second trainable transceiver 214 may retrieve the current rolling code value 216 for the device 212 from the cloud computing system 18. This may provide an advantage in that each of a plurality of trainable transceivers may advance the rolling code value 216 with each trainable transceiver having access to the current rolling code value 216. Each trainable transceiver may therefore have access to a code value that the device 212 will accept therefore allowing reception of the activation signal. This may also provide an advantage in that a plurality of trainable transceiver may use the same serial number. The rolling code values 216 for a device 212 may be stored in the cloud computing system 18 so that multiple trainable transceivers can use the same serial number and have access to the current roll value.

Still referring to FIG. 10, during the training process of training a trainable transceiver to control a device, the trainable transceiver 210 and/or device 212 may exchange information (e.g., seed values) such that both the trainable transceiver 210 and the device 212 maintain and/or generate the same rolling code encryption information. In one embodiment, the trainable transceiver 210 transmits encryption information acquired during the training process to the cloud computing system 18. The cloud computing system 18 may store this encryption information related to the device. The cloud computing system 18 may also use encryption information to generate and/or maintain a roll (e.g., database) of rolling code values for use in communication with the device 212. The trainable transceiver 210 may erase or otherwise not permanently store the encryption information.

In one embodiment, the trainable transceiver 210 sends a request transmission to the cloud computing system 18 when formatting an activation signal (e.g., in response to a user input) which causes the cloud computing system 18 to transmit one or more rolling code values 216 to the trainable transceiver 210. For example, the cloud computing system 18 may transmit the current rolling code value 216 to the trainable transceiver 210. Alternatively, the cloud computing system may transmit a series of rolling code values (e.g., the next 250 values) that the device 212 will accept as valid codes. The trainable transceiver 210 may use one or more of rolling code values to format an activation signal for controlling the device 212. In other embodiments, the cloud computing system 18 may periodically transmit a series of rolling codes to one or more trainable transceivers 210 and 214. This may allow one or more trainable transceivers 210 and 214 to send a plurality of activation signals to the same device 212 before needing to acquire more rolling codes from the cloud computing system 18.

In one embodiment, the cloud computing system 18 advances the current rolling code value 216 upon receiving the request transmission from the trainable transceiver 210 for the current rolling code value 216. Alternatively, the cloud computing system 18 may advance the current rolling code value 216 upon transmitting the previous current rolling code value 216 to the trainable transceiver 210. In other embodiments, the cloud computing system 18 may advance and/or calculate rolling code values, which may include the current rolling code value 216, upon taking other actions such as after a periodic transmission of a set of rolling codes to one or more trainable transceivers 210 and 214. In one embodiment, the trainable transceiver 210 transmits a signal to the cloud computing system 18 upon transmitting an activation signal. The cloud computing system 18 may use this signal as a trigger to update the current value of the rolling code 216. In other words, the trainable transceiver 210 may transmit information to the cloud computing system 18 indicating that an activation signal for a particular device 212 has been sent (e.g., thus advancing the rolling code(s) that the device will accept if the device receives the activation signal), and the cloud computing system 18 may update the current rolling code value 216 in response.

Still referring to FIG. 10, multiple trainable transceivers 210 and 214 may use the techniques described above as in the following example. The first trainable transceiver 210 may receive a user input for activating the first device 212. The first trainable transceiver 210 may send a request transmission to the cloud computing system 18 including information identifying the first device 212 and requesting the current rolling code value 216 for the first device 212. The first trainable transceiver 210 may receive the current rolling code value 216 (e.g., first rolling code value) and the cloud computing system 18 may advance the current rolling code value 216 to a second rolling code value. The first trainable transceiver 210 may use the first rolling code value to format and/or transmit an activation signal to the first device 212. The second trainable transceiver 214 may then receive an input corresponding to sending an activation signal for controlling the first device 212. The second trainable transceiver 214 may send a request to the cloud computing system 18, and, in response to the request, receive the second rolling code value from the cloud computing system 18. The second rolling code value is the current rolling code value 216 stored in the cloud computing system 18 and expected by the first device 212 (e.g., both the cloud computing system 18 and the device 212 have generated corresponding rolls based on the same seed value exchanged during training). The second trainable transceiver 214 may then format and/or send an activation signal to the first device 212 using the second rolling code value received from the cloud computing system 18.

As explained above, other techniques may be used to allow a plurality of trainable transceiver to control a device using encryption information stored in the cloud computing system. The same techniques may be used to allow one or more trainable transceivers to control a plurality of devices. The cloud computing system may store encryption information corresponding to a plurality of devices. For example, the cloud computing system may store the current rolling code values for three devices. Each trainable transceiver may receive rolling code values corresponding to a particular device. For example, a request transmission sent by a trainable transceiver may include identification information specifying for which device the current rolling code value is requested.

Additional Functions and Embodiments

Generally, the trainable transceiver may include or be a configurable button for controlling a device such as mobile communications device or other device in communication with the trainable transceiver using one or more of the techniques described herein or otherwise in communication with the trainable transceiver. An application running on the device (e.g., mobile communications device) may be used to configure the button of the trainable transceiver to cause the application, another application, or the device (e.g., mobile communications device) to take a certain action in response to a user input. For example, pressing the button may cause the trainable transceiver to transmit information and/or instructions which when received by the device cause the device to take a particular action. For example, pressing the button may cause the transmission of an instruction to a mobile communications device which causes the mobile communications device to place a telephone call, begin playback of an audio file, and/or take another action. Advantageously, this may allow for control of the device while the device is not readily accessible (e.g., a mobile communications device is in the pocket of a user). For example, the user may press the button on the trainable transceiver rather than removing the device from his or her pocket to provide an input to the device. In further embodiments, the cloud computing system (e.g., a cloud computing system client) may be used to configure the button(s) or other input devices of a trainable transceiver to cause supplemental actions (e.g., configure the trainable transceiver for controlling a device such as mobile communications device or other device in communication with the trainable transceiver).

Generally, the trainable transceiver may determine information about a home electronics device, remote device, original transmitter, and/or other device without being trained to control the device. For example, the trainable transceiver may learn information such as activation signal parameters, training information, device identification information, status information, and/or other information from communication with the device yet not configure itself or be configured to send activation signals formatted to control the device. The trainable transceiver may transmit this information to one or more additional devices. For example, the information may be transmitted to the cloud computing system. In other embodiments, the information is transmitted to a mobile communications device. The mobile communications device may be configured to display the information or part of the information to a user (e.g., via an application and display). For example, a trainable transceiver may receive an activation signal sent by an original transmitter. The trainable transceiver may determine information such as activation signal parameters based on the signal from the original transmitter. Rather than or in addition to using this information for formatting activation signals, the trainable transceiver may transmit the activation signal parameters to a mobile communications device which may in turn display the activation signal parameters to a user. Other information may be determined, transmitted, and/or displayed.

Generally, the trainable transceiver store configuration information used to automatically configure the trainable transceiver in response to a communication from another device. In one embodiment, profile information and/or a profile containing other information (e.g., activation signal parameters, button or input device assignments for the activation signal parameters, etc.) may be stored on or tied to a key fob or vehicle key. The key fob or vehicle key may transmit the information and/or an identifier to the trainable transceiver. In one embodiment, the key fob or vehicle key transmits activation signal parameters for one or more devices along with operator input device assignments for the activation signal parameters. For example, the key rob or vehicle key transmits information which the trainable transceiver receives and uses to format activation signals for particular devices based on user input from a button corresponding to the device as determined based on the information. The key fob or vehicle key may transmit this information automatically when the key fob or key is within transmission range of the trainable transceiver. In other embodiments, the key fob or vehicle key transmits this information in response to a request transmission from the trainable transceiver. The request transmission may be sent by the trainable transceiver periodically, continuously, in response to the powering on, in response to a vehicle being started, in response to a user input corresponding to sending an activation signal (e.g., pushing a button), and/or otherwise be sent based on a schedule or triggering event.

In one embodiment, the key fob, vehicle key, mobile communications device, and/or other device transmits identification information only. The trainable transceiver may receive this identification information from the key fob or vehicle key. In some embodiments, the trainable transceiver receives the identification information indirectly such as through a vehicle electronics system in communication with the key fob or vehicle key. The trainable transceiver may store activation signal parameters, button assignments, and/or information such that the information is tied to a particular key fob or vehicle key. When the trainable transceiver receives identification information from the key fob or vehicle key, the trainable transceiver may configure itself to send activation signal parameters based on the activation signal parameters and/or button assignments stored with respect to that identification information. For example, the trainable transceiver may receive first identification information identifying a first key rob. In response, the trainable transceiver may configure itself to send activation signals based on a first set of activation signal parameters and/or button assignments. The trainable transceiver may then receive a second identification information identifying a second key fob. In response, the trainable transceiver may configure itself to send activation signals based on a second set of activation signal parameters and/or button assignments.

The above techniques may allow the trainable transceiver to automatically configure itself based on the identification information to correspond to multiple user's preferences and/or configurations. For example, a first user may have three button configured to open a first garage door opener, open a second garage door opener, and turn on lights respectively. When the first user operates a vehicle, the trainable transceiver associated with the vehicle may automatically configure itself to perform these functions with these buttons in response to the identification information, activations signal parameters, button assignment information, and/or other information received from a first key fob. When a second user operates the vehicle, the trainable transceiver may be configured in a different configuration in response to identification information, activations signal parameters, button assignment information, and/or other information received from a second key fob. For example, the buttons may be configured to open the second garage door opener, turn on the lights, and turn on a stereo respectively.

Generally, a cloud computing system client and/or mobile application may be used to manage security features of a trainable transceiver system. In one embodiment, a cloud computing system client and/or mobile communications device (e.g., application running on a mobile communication device) is used to create and/or manage schedules allowing for use of the trainable transceiver system only at certain times. For example, a schedule may be created which only allows a trainable transceiver to access encryption information, activation signal parameters, or other information for a device at certain times (e.g., between 9 am and 5 pm). Without access to the information, the trainable transceiver may not be capable of formatting an activation signal which when transmitted will control a device. This may allow a user to control access and/or use. For example, a user may provide another person with a trainable transceiver (e.g., give the person a hand held trainable transceiver, lend the person the user's vehicle with an integrated trainable transceiver, etc.). The user may set a schedule using a cloud computing system client and/or mobile application which does not allow that trainable transceiver access to information at certain times as discussed above. Advantageously, a user may employ this system to grant control of a device at certain times. For example, another person may be allowed to control a gate to gain entrance to the user's property every Friday between 9 am and 5 pm. A user may grant one-time temporary access in some embodiments.

In further embodiments, a user may provide limited access to a trainable transceiver through the use of a cloud computing system client when given identification information corresponding to the other trainable transceiver. For example, a user may have one or more trainable transceivers used by the user. The user may want to grant control of one or more devices to another person using an additional trainable transceiver. The other person may provide the user with identification information corresponding to his or her additional trainable transceiver. The user may provide this information to the cloud computing system via a cloud computing system client or mobile application. The cloud computing system may use the identification information to provide the additional transceiver with activation signal parameters, device identification information, training information, and/or other information and/or instructions which the additional trainable transceiver uses to configure itself to send activation signals to the device. A user may create a schedule which limits access from activation signals sent by the additional transceiver using one or more of the techniques described above. For example, the additional trainable transceiver may have to access the cloud computing system for encryption information or other activation signal parameters prior to sending an activation signal. The cloud computing system may not transmit this information if the request is sent outside of a window of time set by the user (e.g., outside of the scheduled time). In other embodiments, the additional trainable transceiver may be given one time temporary control of the device. For example, the cloud computing system may transmit one rolling code value to the additional trainable transceiver (e.g., using the identification information of the additional trainable transceiver). When the additional trainable transceiver sends an activation signal using the rolling code value which is received by a device, the device may activate as the code value matches a value expected by the device. Upon receiving the code value, the device may advance the roll. The additional trainable transceiver will not be able to control the device again as the trainable transceiver does not have the new code value. In some embodiments, the additional trainable transceiver may be given a fixed number of codes. For example, the additional trainable transceiver may be given two codes, one to open a garage door and one to close a garage door. In other embodiments, other or additional techniques are used to control access and/or provide one time access. For example, the cloud computing system may use status information received from a device to control the number of times access is allowed. For example, the cloud computing system may prevent the additional trainable transceiver from controlling a garage door opener (e.g., by not responding to additional requests for activation signal parameters, sending an instruction to erase stored information for the device, etc.) once the cloud computing system has determined that a garage door has been opened once and closed once based on status information the garage door opener has provided to the cloud computing system using one or more of the techniques described herein.

In other embodiments, the user controls home electronics devices, remote devices, and/or other devices configured to receive activation signals with the above described techniques rather than controlling access via a trainable transceiver. For example, the cloud computing system may be in communication with one or more devices as described herein. The cloud computing system may provide information to the device such as additional encryption information to be used by the device in allowing an additional trainable transceiver to control the device. For example, the cloud computing system may transmit the same seed to the additional trainable transceiver and to the device. This may allow encrypted communication between the device and the additional trainable transceiver. The same or similar scheduling techniques may be used. For example, the device may request the current value of the roll from the cloud computing system in response to receiving an activation signal from the additional transceiver and check the signal against the value provided by the cloud computing system.

In further embodiments, a trainable transceiver may be temporarily disabled. For example, a user may temporarily disable a trainable transceiver when lending their vehicle including the trainable transceiver to another person (e.g., lending the vehicle to a friend, having the vehicle parked by a valet, etc.). In one embodiment, a mobile communications device and/or application running thereon may transmit an instruction to the trainable transceiver to enable or disable the trainable transceiver. Disabling the trainable transceiver may be or include preventing the transmission of signals using a transceiver circuit, preventing access to one or more activation signal parameters, and/or otherwise preventing the trainable transceiver form sending activation signals and/or communicating with a device. Enabling the trainable transceiver may reverse the effects of disabling the trainable transceiver. In some embodiments, the enabling or disabling the trainable transceiver may require a user to provide the trainable transceiver with a security code. For example, the user may enter a security code on a mobile communications device in communication with the trainable transceiver. In other embodiments, the user may enter the security code on the trainable transceiver.

In further embodiments, a mobile communications device may transfer information to another mobile communications device using a combination of accelerometers and a wireless communication technique. For example, a mobile communications device may acquire activation signal parameters, training information, and/or other information related to a home electronics device, remote device, and/or other device using one or more of the techniques described herein. The first mobile communications device which has acquired the information may transfer the information to a second mobile communications device. For example, the information may be transferred using NFC transceivers and an NFC protocol.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a remote device, comprising:

a first trainable transceiver configured to transmit a request transmission for a current value of a code roll to a cloud computing system, the code roll being for the first trainable transceiver to format an activation signal to control the remote device, wherein receipt of the request transmission causes the cloud computing system to transmit the current value of the code roll and advance the code roll to a new value after transmitting the current value of the code roll; and a second trainable transceiver operable to receive, from the cloud computing system, the current value of the new roll.

2. The system of claim 1, wherein the request transmission includes a user identification corresponding to the first trainable transceiver, a request to provide the current value of the code roll to the second trainable transceiver, and a user identification corresponding to the second trainable transceiver.

3. The system of claim 1, wherein the cloud computing system is configured to receive permission setting information from a user, and wherein the cloud computing system is configured to selectively transmit the current value of the code roll to the first trainable transceiver or the second trainable transceiver based on the permission setting information.

4. The system of claim 3, wherein the first trainable transceiver is configured to receive training information for the remote device from the cloud computing system.

5. The system of claim 3, wherein the cloud computing system is configured to receive the permission setting information from a cloud client.

6. The system of claim 3, wherein first trainable transceiver is configured to transmit the permission setting information to the cloud computing system.

7. The system of claim 3, wherein the cloud computing system is configured to receive the permission setting information from a mobile communications device.

8. A method for controlling a remote device, comprising:

storing, in a cloud computing system, a code roll corresponding to the remote device;

receiving, from a first trainable transceiver and at the cloud computing system, a first request transmission;

transmitting, from the cloud computing system, a current value of the code roll in response to the first request transmission;

in response to transmitting the current value of the code roll, advancing, by the cloud computing system, the stored code roll to a new value;

receiving, from a second trainable transceiver and at the cloud computing system, a second request transmission; and transmitting, from the cloud computing system, the new value of the code roll in response to the second request transmission.

9. The method of claim 8, wherein the current value of the code roll is transmitted to the first trainable transceiver.

10. The method of claim 8, wherein the request transmission includes a user identification corresponding to the first trainable transceiver, a request to provide the current value of the code roll to a second trainable transceiver, and a user identification corresponding to the second trainable transceiver.

11. The method of claim 8, further comprising:

in response to transmitting the new value of the code roll, advancing the code roll to a second new value.

12. The method of claim 8, wherein the cloud computing system is configured to further transmit training information for the remote device in response to receiving the request transmission.

13. The method of claim 8, further comprising receiving, at the cloud computing system, permission setting information from a user, wherein the cloud computing system is configured to selectively transmit the current value of the code roll to the first trainable transceiver or a second trainable transceiver based on the permission setting information.

14. The method of claim 8, wherein the cloud computing system is configured to receive the permission setting information from a cloud client.

15. The method of claim 8, wherein the cloud computing system is configured to receive the permission setting information from the first trainable transceiver or a second trainable transceiver.

16. A system for installation in a vehicle and for controlling a remote device, comprising:

a first trainable transceiver;

communications electronics; and a processing circuit coupled to the first trainable transceiver and the communications electronics, the processing circuit configured to receive information via the communications electronics from a cloud computing system, wherein the information includes a current value of a code roll associated with the remote device, the code roll stored and advanced to a new value by the cloud computing system subsequent to transmission of the information, wherein the cloud computing system is configured to transmit the new value of the code roll to at least one of the first trainable transceiver and a second trainable transceiver;

wherein the processing circuit is further configured to receive the information selectively transmitted, based on a schedule, from the cloud computing system.

17. The system of claim 16, wherein the cloud computing system is configured to create the schedule based on user inputs received through a cloud computing system client.

18. The system of claim 16, wherein the schedule is configured to allow one time only transmission of information to the processing circuit.

19. The system of claim 16, wherein the schedule corresponds to a user identification associated with the system.

* * * * *